(12) United States Patent
Shinohara et al.

(10) Patent No.: US 6,549,209 B1
(45) Date of Patent: Apr. 15, 2003

(54) IMAGE PROCESSING DEVICE AND IMAGE PROCESSING METHOD

(75) Inventors: Mikio Shinohara, Tokyo (JP); Seisuke Morioka, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/075,626

(22) Filed: May 11, 1998

(30) Foreign Application Priority Data

May 22, 1997 (JP) .............................................. 9-131832

(51) Int. Cl.$^7$ ................................................ G09G 5/39
(52) U.S. Cl. ...................... 345/531; 345/561; 345/536; 345/629
(58) Field of Search ................................. 345/501–503, 345/507–509, 513, 425–429, 430, 531, 536, 545, 556, 559, 561, 629, 643

(56) References Cited

U.S. PATENT DOCUMENTS 5,625,764 A  *  4/1997  Tsujimoto et al. .......... 395/135
6,008,790 A  * 12/1999  Shingu et al. .............. 345/116

* cited by examiner

Primary Examiner—Kee M. Tung
(74) Attorney, Agent, or Firm—Keating & Bennett, LLP

(57) ABSTRACT

The object is to increase the efficiency of processing by conferring the residual image function on hardware and to provide an image processing device wherein processing is implemented at higher speed. In an image processing device equipped with an image memory and a control section that writes generated image data to the image memory, there is provided a blend circuit that reads image memory or image data from image memory and attenuates the read image data and that writes this together with newly generated image data into another image memory, thereby producing a residual image effect.

18 Claims, 24 Drawing Sheets

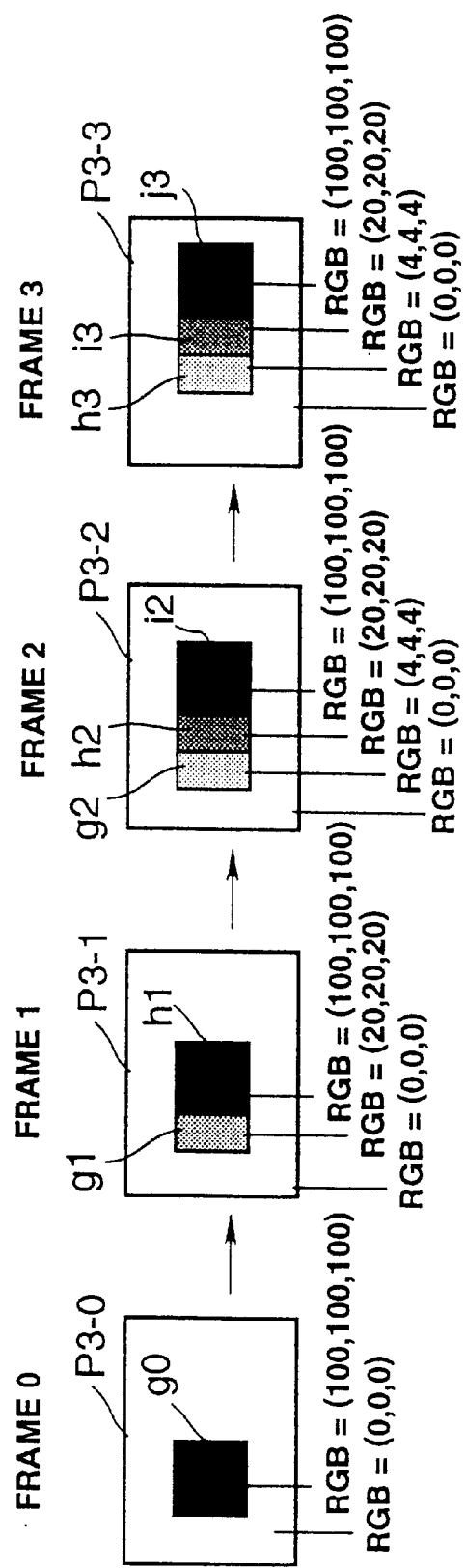

IMAGE PROCESSING DEVICE AND IMAGE PROCESSING METHOD

BACKGROUND OF THE INVENTION

1. Field of the Invention

The present invention relates to an image processing device and image processing method for computer graphics.

2. Description of the Related Art

In the field of computer graphics, various representations are performed on the screen. One of these representations is the residual-image effect, whereby part of a past image is allowed to remain behind a moving object. Conventionally, residual image processing was performed by software. Residual image processing is performed by gradually altering the transparency of the moving object that is displayed, in accordance with its movement. A number of polygons equal to (number of polygons of the object)×(number of residual images) are therefore required in order to represent residual images. In the conventional signal processing device, the residual image portion was calculated in the same way as an ordinary object, and rendering had to be carried out, so the efficiency of processing was poor. Also, if a large number of polygons are employed, the amount of processing involved is large, so the processing took a long time.

Furthermore, while it may be intended to produce the same residual image effect for all polygons, there are also cases in which it is desirable that it should be possible to set a desired residual image effect for each polygon or to effect display with desired polygons emphasised.

SUMMARY OF THE INVENTION

The present invention was made in order to solve the above problems. An object of the present invention is to provide an image processing device wherein the efficiency of processing can be raised and a speeding-up of processing can be achieved by giving the residual image function to hardware.

Also, an object of the present invention is to provide an image processing device whereby a desired residual image effect etc. can be attained for desired polygons.

An image processing device according to the present invention comprises a control section that writes generated image data to a first image memory region and a second image memory region, and further comprises a blend circuit that reads image data from said first image memory region and whereby a residual image effect is generated by attenuating the read image data and writing it together with newly generated image data in said second image memory region.

An image processing device according to the present invention comprises: a frame buffer that stores image data; a frame buffer interface that receives pixel data from a preceding-stage circuit and that writes the data to said frame buffer and that reads data from said frame buffer; a blend rate register that stores a blend rate when mixing pixel data from said preceding-stage circuit with pixel data of said frame buffer; and a first blend circuit that mixes pixel data from the preceding-stage circuit in accordance with the blend rate of said blend rate register with pixel data from said frame buffer interface and returns the result to the preceding-stage circuit.

An image processing device according to the present invention comprises: a frame buffer that stores, in pixel units, image data, blend rate and slope data, which is a parameter for attenuating blend rate; a frame buffer interface that receives, in pixel units, image data from a preceding-stage circuit, blend rate and slope data, and that writes the data to said frame buffer and that reads the data from said frame buffer; a blend circuit that mixes pixel data from a preceding-stage circuit in accordance with the blend rate of said frame buffer with pixel data from said frame buffer interface; a subtraction circuit that subtracts a value corresponding to slope from the blend rate; a comparison circuit that compares the blend rate of said frame buffer with a blend rate from said subtraction circuit; and a selection circuit that selects one or other of the blend rate and slope of said frame buffer and the blend rate and slope from the preceding-stage circuit in accordance with the output of said comparison circuit and outputs the result to the preceding-stage circuit.

An image processing device according to the present invention comprises: a frame buffer that stores image data; a blend rate register that stores a blend rate when pixel data from a preceding-stage circuit and pixel data from said frame buffer are mixed; a blend circuit that mixes pixel data from the preceding-stage circuit with pixel data from said frame buffer in accordance with the blend rate of said blend rate register and that returns the result to the preceding-stage circuit; and a selector that receives a flag from the preceding-stage circuit and that selects one of the image data from the preceding-stage circuit or image data output from said blend circuit and that writes the selected image data to said frame buffer.

An image processing device according to the present invention comprises: a control section that writes generated image data to a first image memory region and a second image memory region, further comprising: means for writing in the other image memory one of mixed image data obtained by attenuating image data read from one of said first image memory region and second image memory region and mixing it with newly generated image data, and said newly generated image data.

An image processing method for applying a residual image effect to an entire screen according to the present invention comprises: setting the density of the residual image, indicating what percentage of the image data of the previous occasion is to be displayed as residual image, and the separation of residual images, which determines whether the image data to be left as residual image is to be constituted by the data of the previous occasion or the data of the occasion previous to the previous occasion; blending current pixel colour and buffer pixel colour in accordance with the set residual image density and writing the result to a frame buffer; determining in respect of all pixels in a region whether processing has been completed or not, and, if processing of all the pixels has not been completed, repeating said writing step; and determining whether processing of all the regions has been completed, and, if processing in respect of all the regions has not been completed, repeating said writing step.

An image processing method for applying a residual image effect in polygon units according to the invention comprises: setting the density of a residual image, indicating what percentage of the image data of the previous occasion is to be displayed as residual image and the separation of residual images, that determines whether the image data that is to be left behind as residual image is that of the data of the previous occasion or of the data of the occasion previous to the previous occasion; sorting the polygons contained in the image; blending the current pixel colour and buffer pixel colour in accordance with the set density of the residual image and writing the result to the frame buffer; comparing the density of the image of the current pixel with that when the slope data, which is a parameter indicating the degree of attenuation from the density of the image, is subtracted, and writing the larger image density and slope data in the residual image buffer; determining whether or not processing has been performed in respect of all the pixels in the region and, if processing has not been completed in respect of all pixels, repeating said writing step; and determining whether processing has been completed in respect of all regions, and, if processing has not been completed in respect of all regions, repeating said writing step.

BRIEF DESCRIPTION OF THE DRAWINGS

FIG. 23 is a view showing an example of a residual image obtained in accordance with this embodiment 7.

DESCRIPTION OF PREFERRED EMBODIMENTS

Embodiment 1 of the Invention

Below, a device and method according to a first embodiment are described.

Figure 1:
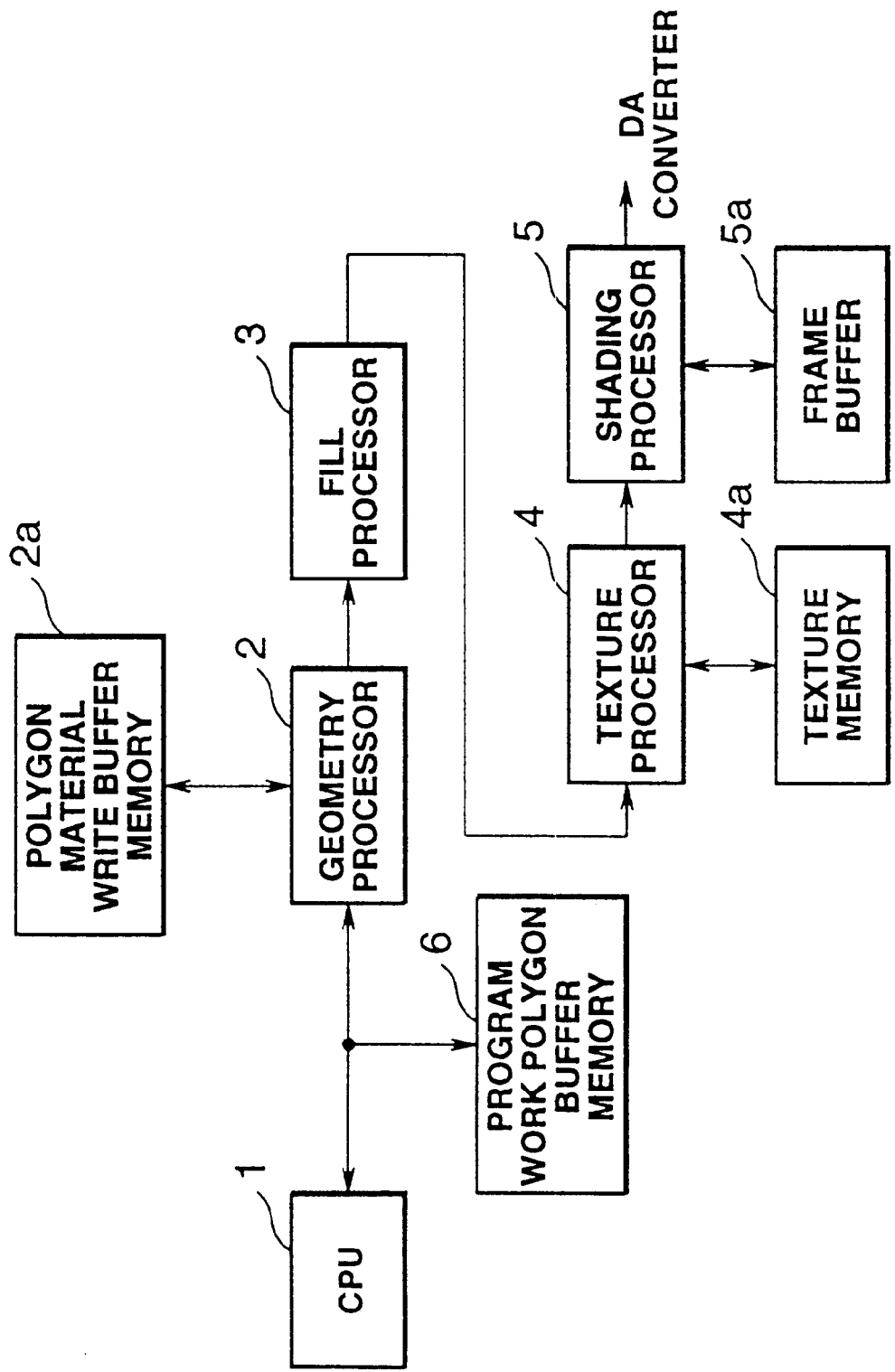
FIG. 1 is a schematic functional block diagram of an image processing device according to embodiment 1 of the present invention.

FIG. 1 is an approximate functional block diagram of an image processing device relating to the first embodiment. In the drawing, 1 is a CPU (central processing unit), which implements various control functions, by performing operations relating to objects in a virtual space, obtaining information therefor, and the like. 2 is a geometry processor, which performs geometric transformations (vector calculations), such as co-ordinates transformation, clipping, and perspective transformation, as well as intensity transformation, relating to polygons in three-dimensional computer graphics. 2a is polygon material light buffer memory (polygon material light buffer RAM), which stores valid polygon data, material data and light data for one frame, when the geometry processor 2 is processing data. A 'polygon' is a polyhedral object used to compose a three-dimensional figure in a virtual space. The contents of the data stored in the buffer memory 2a are as follows: Polygon link information, co-ordinates information, other attribute information LINK X, LINK Y, X, Y, iz, Tx, Ty, Nx, Ny Sign Nz, Alpha, Light ID, Material ID, . . . etc.

Material Information

Depth enable, Depth function, Depth density, Texture enable, Fog enable, translucency enable, texture type, texture function, offset x,y, size x,y, repeat x,y, mirror x,y, colour id, Shininess, material specular, Material emission, Polygon colour, Texture mode, blend mode, etc.

Light Information

Light Position, Light Direction, Light Type, Attenuation, Cutoff, Spotexp, Light Colour, Light Ambient, etc.

3 is a fill processor which carries out processing for hidden surface removal. The fill processor 3 fills in polygons in a region, and for each pixel it determines the information for the polygon which is furthest to the front.

4 is a texture processor. The texture processor 4 applies texture to each pixel in a region. Texture mapping is a process of creating an image by applying (mapping) a pattern (texture) defined separately from the shape on to the surface of an object of a defined shape. 4a is a texture memory (texture RAM), which stores a texture map for use in processing by the texture processor 4.

5 is a shading processor. Shading is a method whereby a representation similar to a shadow of an object composed by polygons is created by taking into account the normal vectors of the polygons, the position and colour of the light source, the position of the viewpoint, the direction of the line of sight, and the like. The shading processor 5 determines the intensity of each pixel in the region. 5a is a frame buffer which records screen image data. Data is read out sequentially from the frame buffer 5a and converted from digital data to an analogue signal, which is supplied to a display, such as a CRT, liquid crystal display device, plasma display device, or the like, (omitted from drawing).

6 is a program work polygon buffer RAM for storing CPU 1 programs and commands for the graphics processors (polygon databases, display lists, etc.). This buffer memory 6 is a work memory for the CPU 1.

The fill processor 3, texture processor 4 and shading processor 5 carry out 'rendering', which is an operation for creating a picture using a model defined by virtual spatial co-ordinates. In rendering, each region is processed in sequence from the top left of the screen. The rendering process is repeated for each region.

Next, the details of an image processing device relating to the first embodiment will be described on the basis of the functional block diagram in FIG. 2 and FIG. 5.

Figure 2:
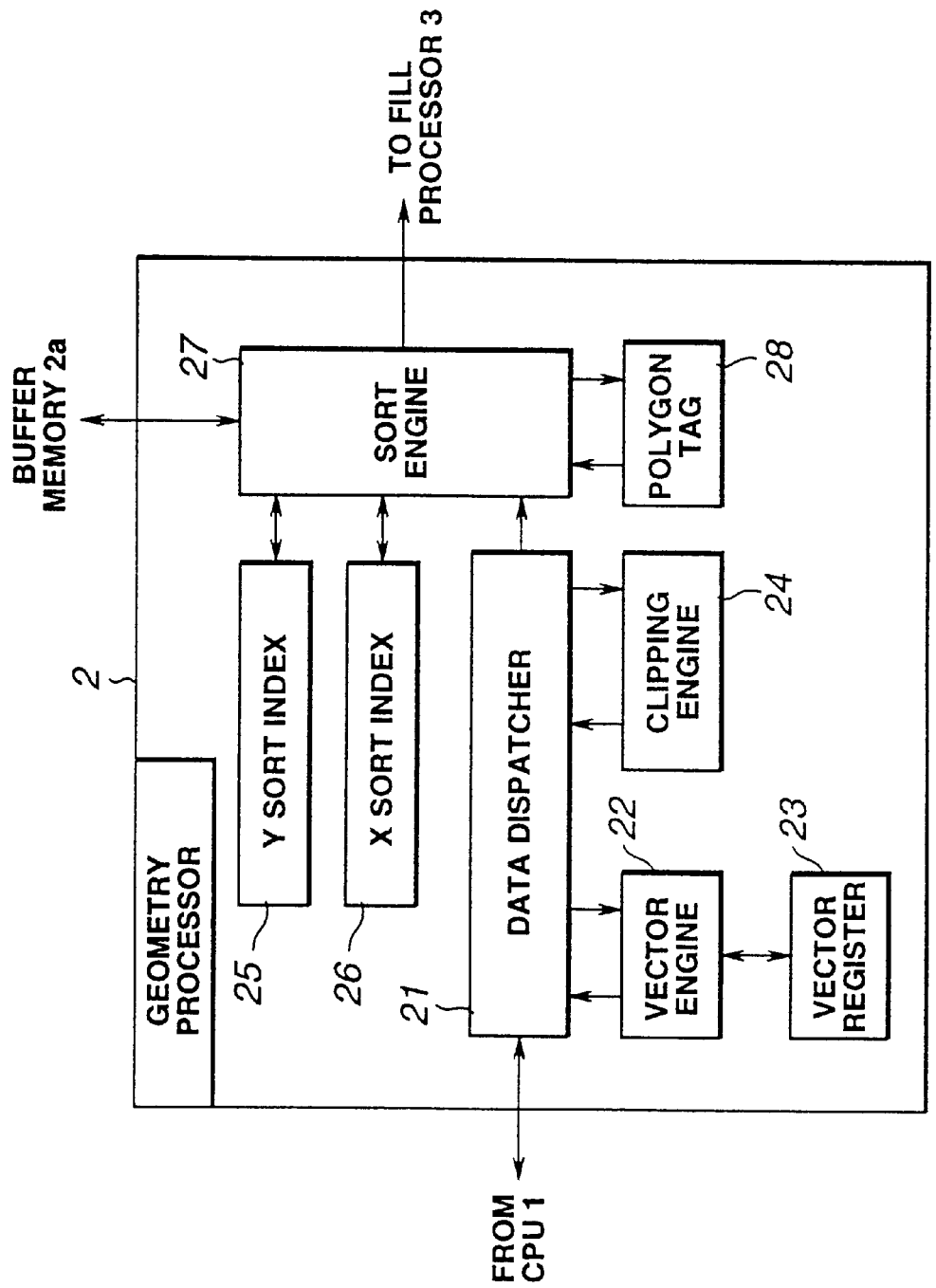
FIG. 2 is a functional block diagram of a geometry processor of an image processing device according to embodiment 1 of the present invention.

FIG. 2 shows a functional block diagram of a geometry processor 2. In this diagram, 21 is a data dispatcher, which reads and analyses commands from the buffer memory 6, controls a vector engine 22 and clipping engine 24 on the basis of the analysed results, and outputs the processed data to a sort engine 27.

22 is a vector engine 22, which performs vector calculations. The vectors handled by the vector engine 22 are stored in a vector register 23.

23 is a vector register, which stores the vector data calculated by the vector engine 22.

24 is a clipping engine, which performs clipping.

25 is a Y-sort index (Y-sort INDEX), which stores a Y index used for Y-sorting in the sort engine 27.

26 is an X-sort index (X-sort INDEX), which stores an X index used for X-sorting in the sort engine 27.

27 is a sort engine, which identifies polygons present in a particular region from the buffer 6, by carrying out X-sorting and Y-sorting. The identified polygons are stored in the buffer memory 2a, and are also supplied to the fill processor 3 for rendering. The short engine 27 also controls the polygon TAG 28 and polygon cache 34.

28 is a polygon TAG, which is a buffer for storing the polygon cache 34 TAG.

Figure 3:
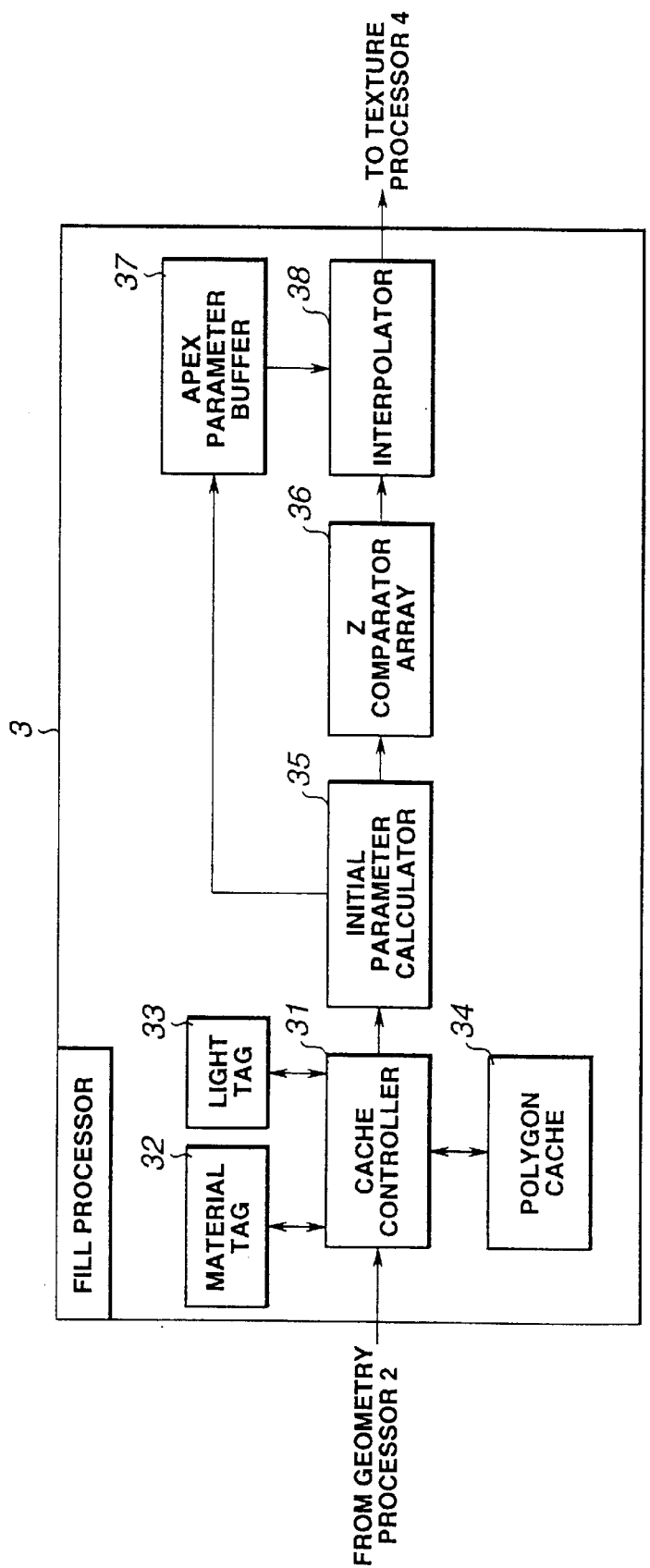
FIG. 3 is a functional block diagram of a geometry processor of an image processing device according to embodiment 1 of the present invention.

FIG. 3 is a functional block diagram of a geometry processor 2. In this diagram, 31 is a cache controller for controlling material caches 42, 45, 51b, 52a, 53a and a light cache 51a, which are described later.

32 is a material TAG, which stores TAGs for the material caches 42, 45, 51b, 52a, 53a and the light cache 51a.

33 is a light TAG, which is a buffer for storing a TAG for the light cache 51a.

34 is a polygon cache, which is a cache memory for polygon data.

35 is an initial parameter calculator, which determines initial DDA values.

36 is a Z comparator array, which performs a Z comparison between polygons, for the purpose of hidden surface removal, and overlays polygon ID and internal ratios t0, t1, t2. The Z comparator array 36 comprises 8×8=64 Z comparators. Since these work in parallel, processing can be implemented for 64 pixels simultaneously. Data relating to the polygon is stored in one of the z comparators. This may be, for example, polygon ID, iz, t0, t1, t2, window, stencil, shadow, or the like.

37 is a vertex parameter buffer, which stores the parameters at polygon vertices. It has a capacity for 64 polygons, corresponding to the size of the Z comparator array 36.

38 is an interpolator, which calculates pixel parameters by interpolation, using the calculation results t0, t1, t2 and iz from the Z comparator array 36 and the contents of the vertex parameter buffer 37.

Figure 4:
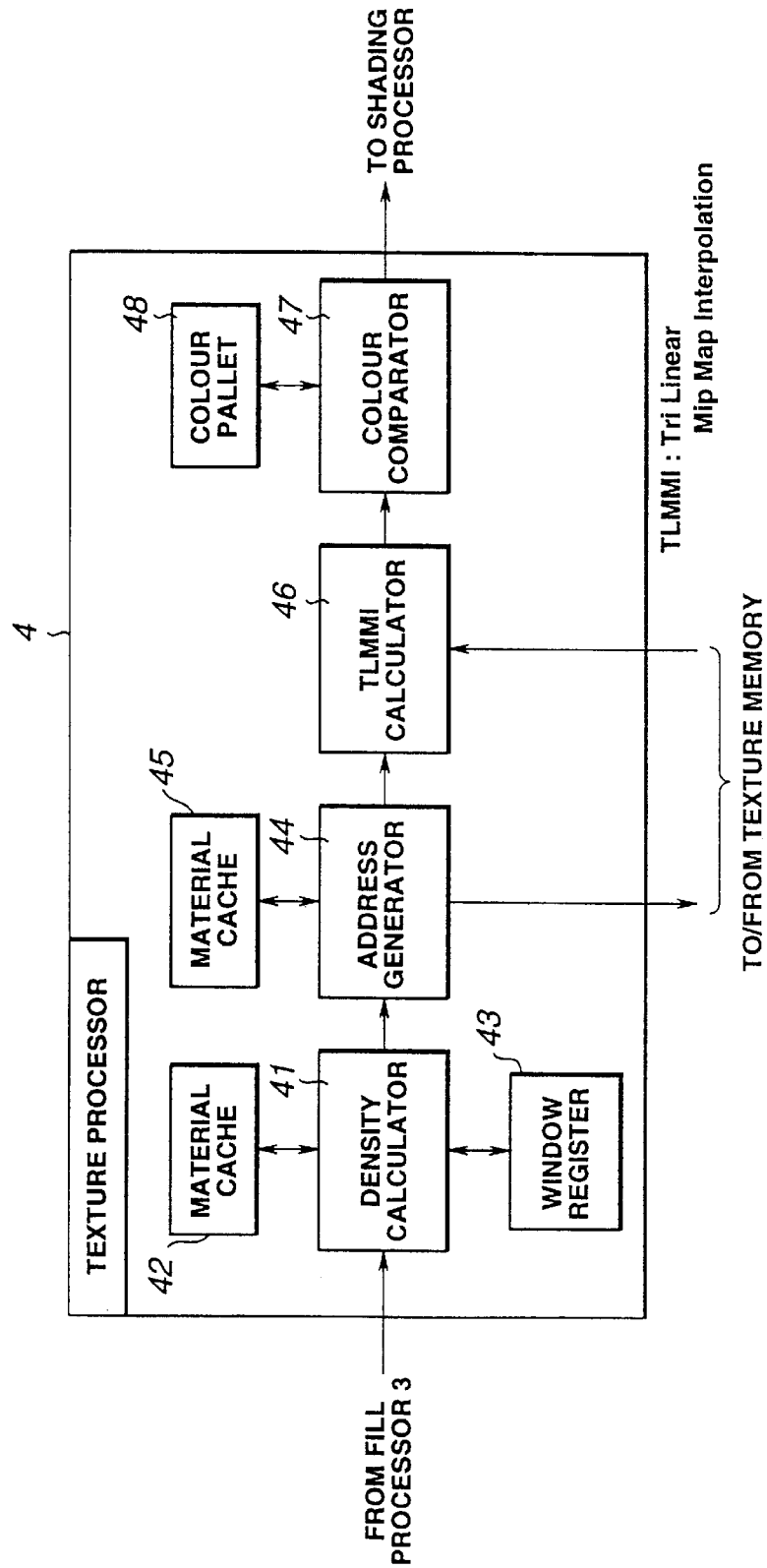
FIG. 4 is a functional block diagram of a texture processor of an image processing device according to embodiment 1 of the present invention.

FIG. 4 is a functional block diagram of a texture processor 4. In this diagram, 41 is a density calculator, which calculates a blend ratio for fog or depth cueing.

42 is a material cache, which stores data relating to depth information, for example, Depth enable, Depth function, Depth density, Depth end z, Texture enable, Fog enable, etc.

43 is a window register, which is a buffer for storing information relating to windows, for example, kz, cz, fog function, fog density, fog end z.

44 is an address generator, which calculates addresses on a texture map by means of texture co-ordinates Tx, Ty and LOD.

45 is a material cache, which stores data relating to materials, for example, translucency enable, texture type, offset x,y, size x,y, repeat x,y, mirror x,y, colour id, etc.

46 is a TLMMI calculator (TLMMI: Tri-Linear MIP Map Interpolation), which performs tri-linear MIP map interpolation, a form of three-dimensional interpolation. 'MIP map' is a method of anti-aliasing, in other words, eliminating 'jags' (notches) in the texture when carrying out texture mapping. It is based on the following principle. Essentially, the colour (intensity) of an object surface projected on one picture element must take the averaged value for the colour for the corresponding mapping region. If this is not implemented, jags will stand out and the quality of the texture will fall dramatically. On the other hand, if average values are found for each picture element individually, the calculating load will become excessively high, processing will take time, and hence a high-speed processor will be required. The MIP map resolves this problem. In a MIP map, in order to simplify the process of collecting colour (intensity) values for a mapping region corresponding to a single picture element, a plurality of mapping data of two size factors is prepared in advance. The size of the whole mapping region corresponding to the single picture element lies between any two of these data items of two size factors. The colour of the corresponding mapping region can be found by comparing the two data. For example, if there is a normal size screen A and a half-size screen B, then the picture elements in screens A and B corresponding to each picture element in a screen C of 1/1.5 size are determined, respectively. In this case, the colour of the picture elements in screen C is an intermediate colour between the picture elements in screen A and the picture elements in screen B.

47 is a colour converter, which performs colour transformation in the case of 4-bit texels.

48 is a colour pallet, which stores colour information in the case of 4-bit texels. The colour pallet 48 stores colours used when writing graphics. The colour used for each picture element is determined according to the contents of the colour pallet 48.

Figure 5:
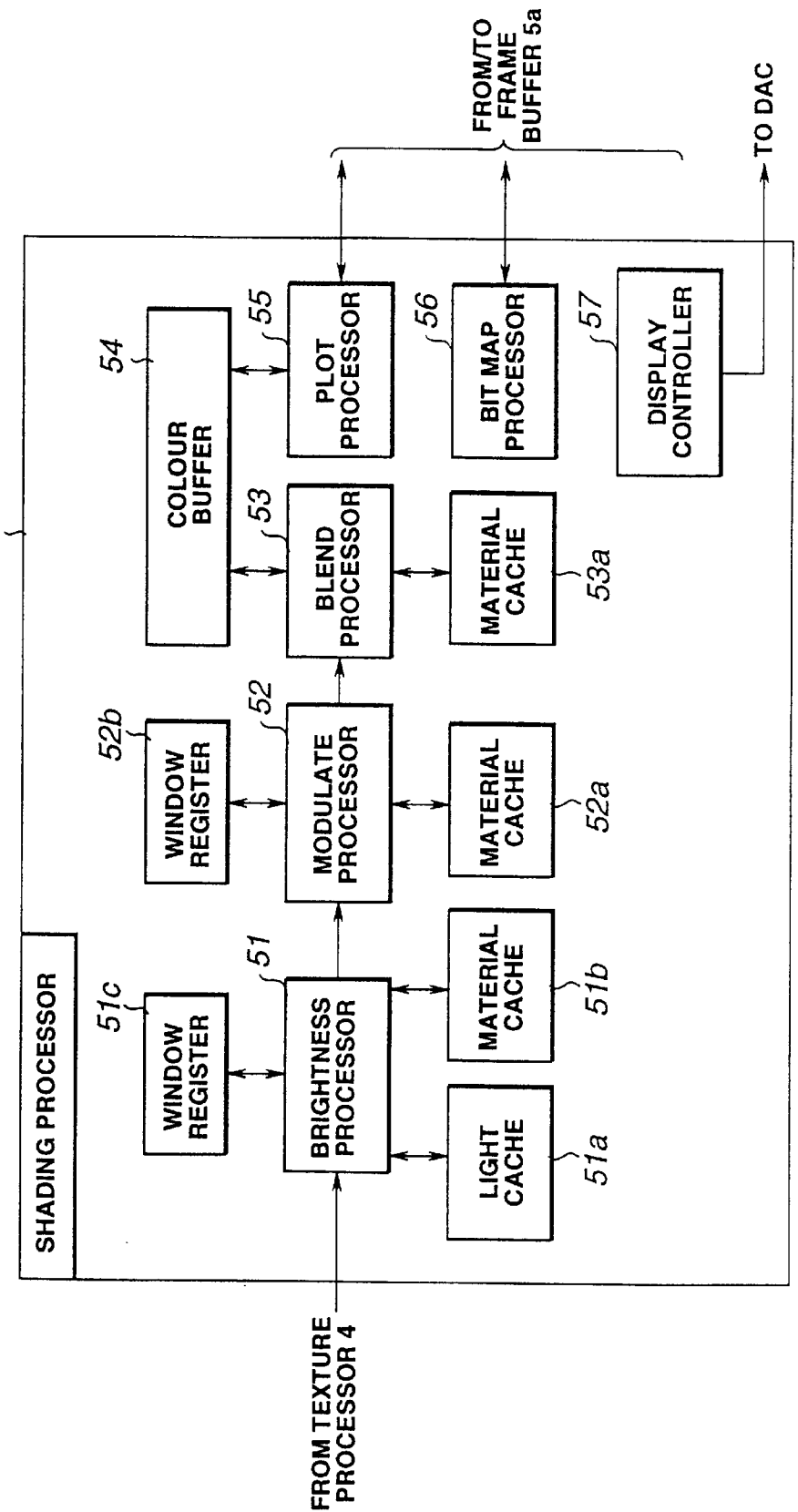
FIG. 5 is a functional block diagram of a shading processor of an image processing device according to embodiment 1 of the present invention.

FIG. 5 is a functional block diagram of a shading processor. In this diagram, 51 is an intensity processor, which calculates the intensity for polygons that have been texture mapped. 51a is a light cache, which stores light information, for example, Light Position, Light Direction, Light Type, Attenuation, Cutoff, Spotexp, Light Colour, Light Ambient, etc.

51b is a material cache, which stores information relating to materials, for example, Sine, Material specular, material emission, etc.

51c is a window register, which stores information relating to windows, for example Screen centre, Focus, Scene ambient, etc.

52 is a modulate processor, which links the polygon colour and texture colour, modulates the intensity, and carries out fog processing.

52a is a material cache, which stores information relating to materials, for example, Polygon colour, Texture mode, etc.

52b is a window register, which is a buffer for storing information relating to windows, for example, Fog colour, etc.

53 is a blend processor, which blends colour data from the colour buffer 54, and writes to the colour buffer 54. The blend processor 53 blends the current pixel colour and the pixel in the frame buffer on the basis of the value in a blend rate register, and writes to the bank frame buffer indicated by the write bank register. Motion blur can be implemented by means of the blend processor 53.

53a is a material cache, which stores information relating to materials, for example, blend mode, etc.

54 is a colour buffer, which is 8×8 in size and has a double-bank- structure.

55 is a plot processor, which writes data from the colour buffer 54 to the frame buffer 5a.

56 is a bitmap processor, which implements bitmap processing.

57 is a display controller, which reads out data from the frame buffer 5a, supplies the data to a DAC (Digital to Analogue Converter), and displays it on a display device (omitted from drawing).

Figure 6:
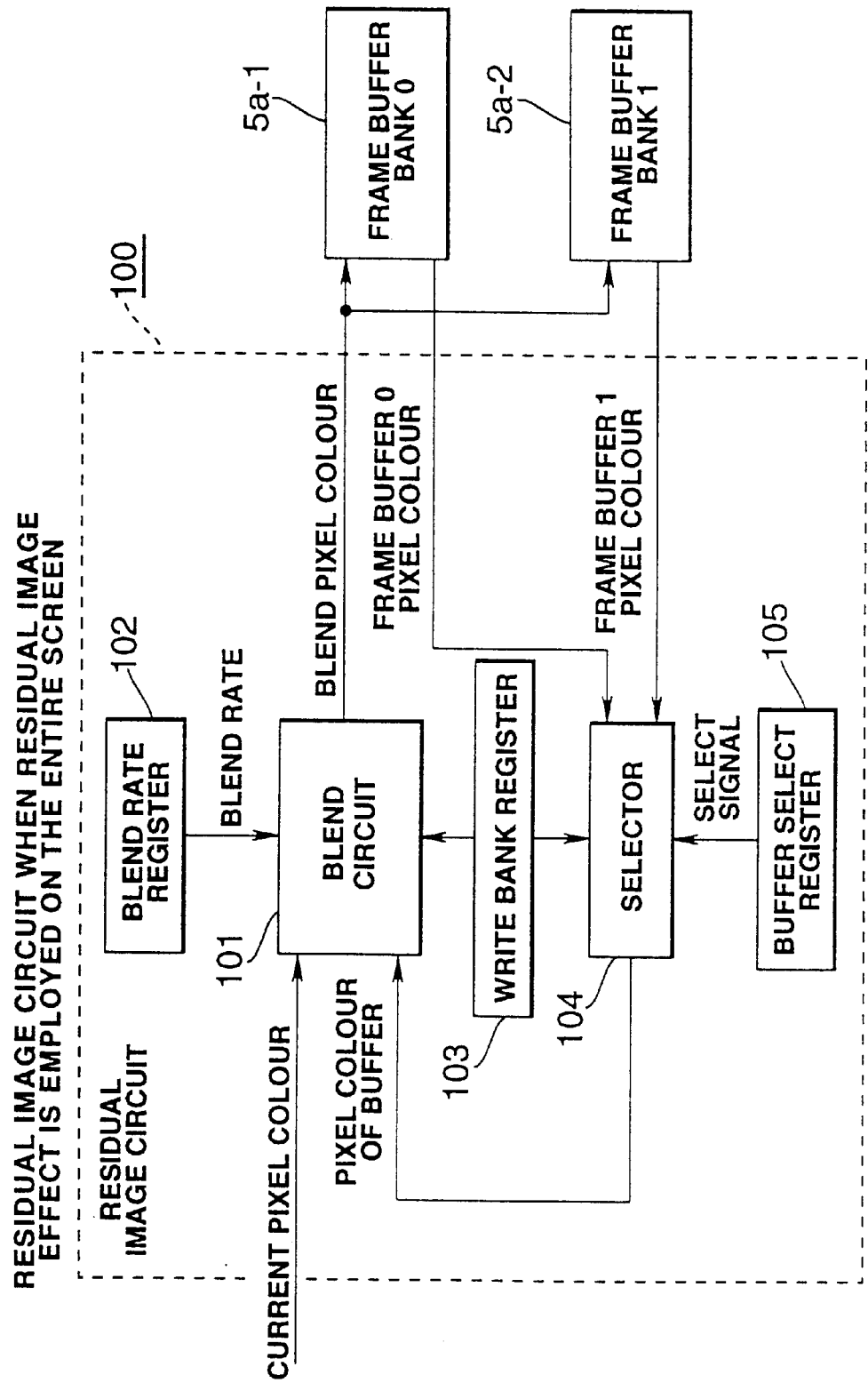
FIG. 6 is a block diagram showing details of the section that performs residual image processing in an image processing device according to embodiment 1 of the present invention.

The functional blocks in respect of the portion where residual image processing is performed in the image processing device of FIG. 1 to FIG. 5 are illustrated in FIG. 6. This view is a functional block diagram of a residual image circuit in the case where a residual image effect is employed in respect of the entire screen. Blend circuit 101 receives current pixel colour from outside residual image circuit 100 and outputs blend pixel colour to external frame buffers 5a-1, 5a-2. Blend circuit 101 is connected to blend rate register 102, write bank register 103, and selector 104. It should be noted that write bank register 103 is also connected to selector 104. Blend rate register 102 supplies blend rate to blend circuit 101. Selector 104 selects one or other of (the read address of) frame buffer 0 pixel colour from frame buffer 5a-1 (bank 0) and (the read address of) frame buffer 1 pixel colour from frame buffer 5a-2 and supplies this to blend circuit 101. Selector 104 performs a select action in accordance with a select signal from buffer select register 105.

In FIG. 6, blend circuit 101 blends the pixel colours of the current pixel colour and the frame buffer 5a in accordance with the ratio of blend rate register 102, and writes the result to the frame buffer of the bank indicated by write bank register 103. The specific processing is described later.

For the pixel colour of the buffer, one or other of the two banks 0, 1 is selected in accordance with the value of the buffer select register 105. Buffer select register 105 has a value indicating one or other of "one frame previous" or "two frames previous". When selector 104 is "one frame previous", the bank other than the one that is being written to is selected; when it is "two frames previous" the same bank is selected. It should be noted that, since in fact the frame buffer comprises only a single memory, the pixel colour is only output from a single bus. In fact, the read location is selected by selecting the read address.

Figure 7:
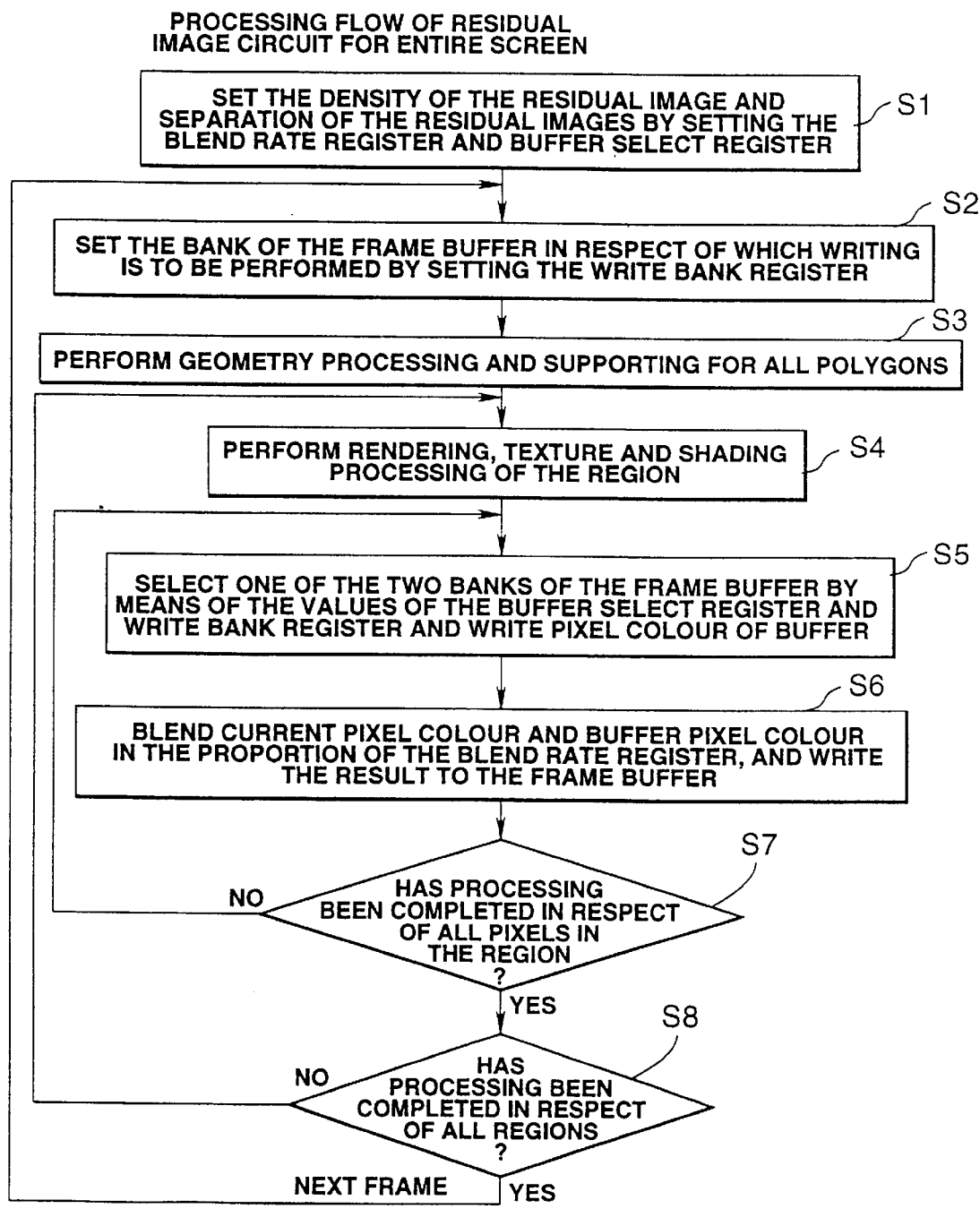
FIG. 7 is a flow chart of residual image processing of an image processing device according to embodiment 1 of the present invention.

FIG. 7 is a flow chart showing the processing of residual image circuit 100 employing the residual image effect on an entire screen.

Step S1: the density of the residual image and the separation of residual images are set by setting blend rate register 102 and buffer select register 105. The density of the residual image is a parameter that indicates what percentage of the image data on the previous occasion is to be displayed as the residual image. A value of for example 20% or 30% is selected. The residual image separation is a parameter that determines whether the image data that is left as residual image is the data of the previous occasion or the data of the occasion before the previous occasion.

Step S2: the write bank register 103 is set, and the bank 0 or 1 of frame buffer 5a in respect of which writing is performed is set.

Step S3: geometry processing and sorting are performed on all the polygons.

Step S4: rendering, texture and shading processing are performed for all the regions.

Step S5: one or other of the two banks 0, 1 of frame buffer 5a is selected and the pixel colour of the buffer is read, in accordance with the value of buffer select register 105 and write bank register 103.

Step S6: the current pixel colour and buffer pixel colour are blended in accordance with the ratio of the blend rate register, and written to the frame buffer.

Blend processing is performed in accordance with the following expression.

(Blend pixel colour)=(current pixel colour)×(1-(blend rate))+ (buffer pixel colour)×(blend rate)

Step S7: for all the pixels within the region, a determination is made as to whether or not processing has been performed. If processing has not been completed for all pixels (No), the procedure returns to step S5. If processing has been completed for all pixels (Yes), the procedure advances to step S8.

Step S8: a determination is made as to whether or not processing has been performed for all regions. If processing has not been completed for all regions (No), the procedure returns to step S4. If processing has been completed for all regions (Yes), the procedure shifts to processing in respect of the next frame, and returns to step S2.

Figure 15:
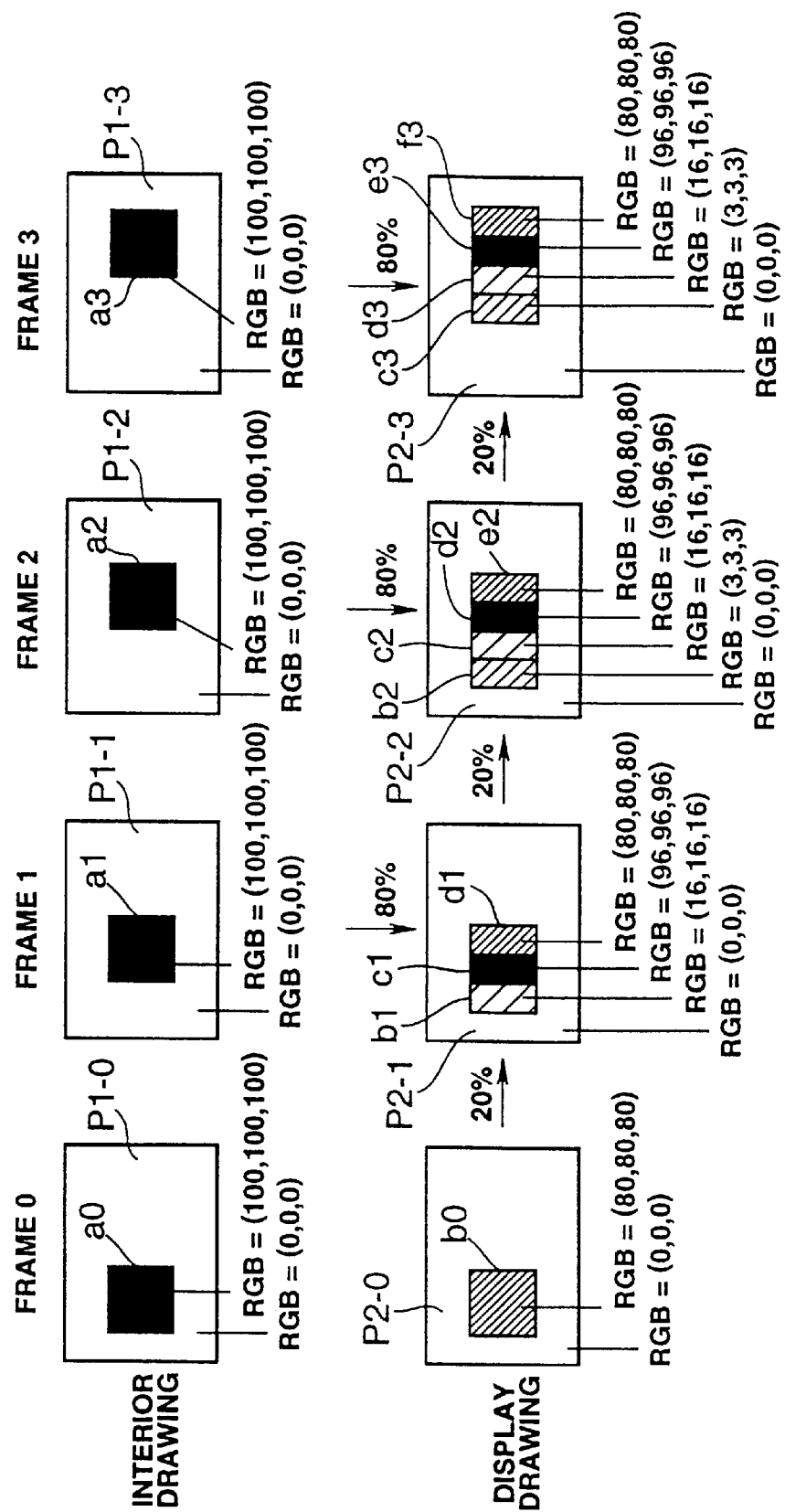
FIG. 15 is an example of a residual image screen of processing to produce a residual image effect on the entire screen according to an embodiment of the present invention.

The residual image effect produced by the residual image circuit of FIG. 6 extends to the entire screen. Let us assume that the blend rate register has a value indicating a ratio of 20%, and the buffer select register has a value indicating "the frame one previous". If the screen is scrolled or the object is moved, a residual image effect as shown in FIG. 15 is obtained.

Embodiment 2 of the Invention

Figure 8:
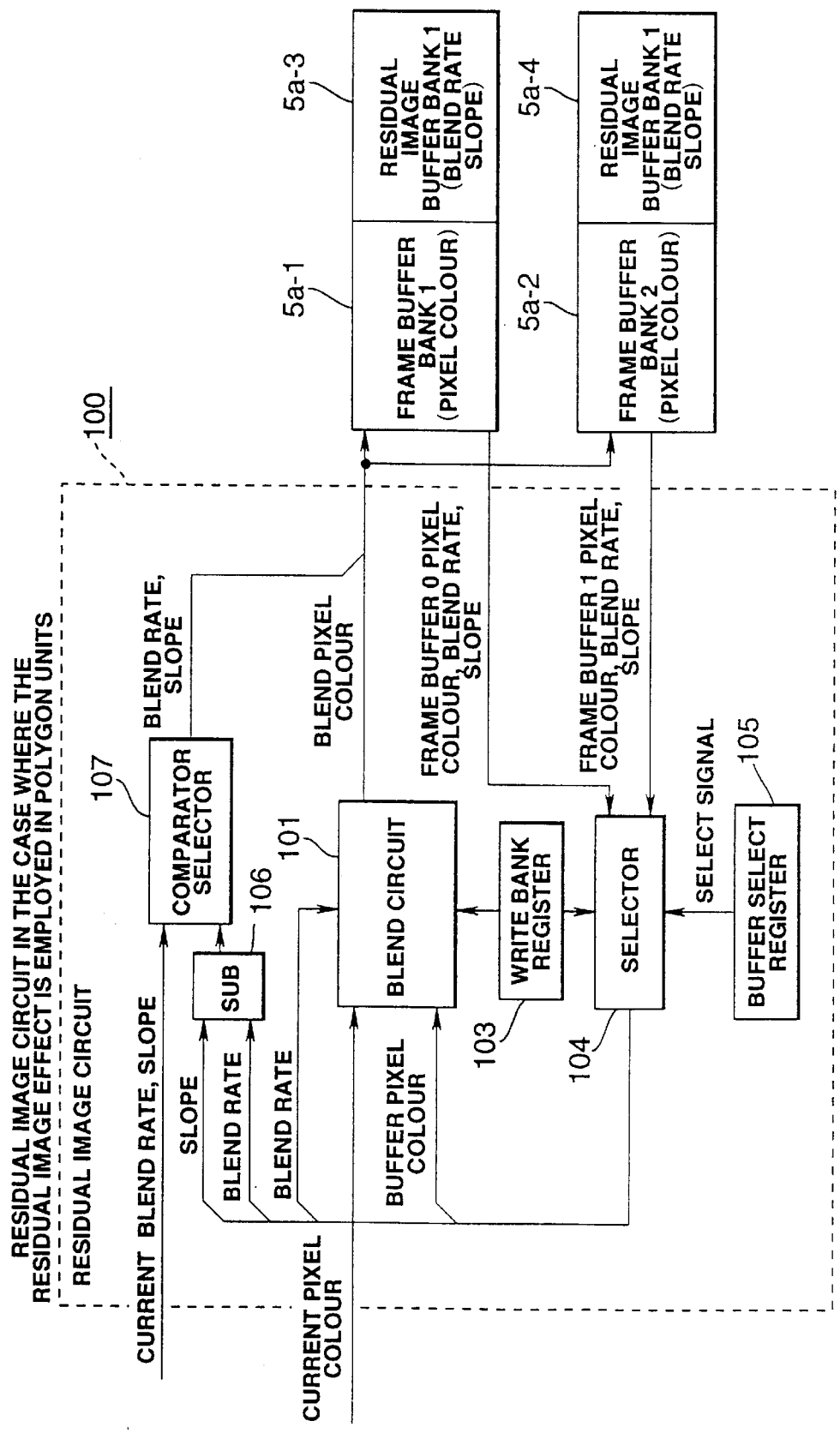
FIG. 8 is a block diagram showing details of the portion that performs residual image processing in an image processing device according to embodiment 2 of the present invention.

A residual image circuit according to this embodiment 2 is shown in FIG. 8. This Figure is a functional block diagram of a residual image circuit when a residual image effect in polygon units is employed.

In comparison with the residual image circuit of FIG. 6, the residual image circuit of FIG. 8 differs in that it has blend rate and slope at pixel units. "Slope" is a parameter for attenuating the blend rate. To blend circuit 101, apart from the current pixel colour that is input from the outside, there is input a slope that expresses the difference of blend rate for the frame unit and blend rate for this pixel, through a selector 104 from residual buffers 5a-3, 5a-4. Residual image buffers 5a-3, 5a-4 store the blend rate and slope in correspondence with colour information of frame buffers 5a-1, 5a-2.

SUB block 106 of FIG. 8 is a circuit that finds the blend rate that is used by the next frame by subtracting the slope from the blend rate in residual image buffers 5a-3, 5a-4. Comparator selector 107 is a circuit that compares the blend rate of the frame buffer calculated by SUB block 106 with the blend rate of the current pixel that is input from outside and selects the larger of these. Comparator selector 107 also selects the slope simultaneously with the blend rate. Comparator selector 107 can reset the blend rate. Selector 104 is constructed such that it can simultaneously select not only the pixel colour of frame buffers 5a-1, 5a-2, but also the blend rate and slope of residual image buffers 5a-3, 5a-4. Blend circuit 101 employs the blend rate that is stored in residual image buffers 5a-3, 5a-4 and selected by selector 104. It should be noted that since in fact the frame buffer consists of a single memory, the pixel colour is output from only one bus. In fact, the reading location is selected by selecting the read address.

Figure 9:
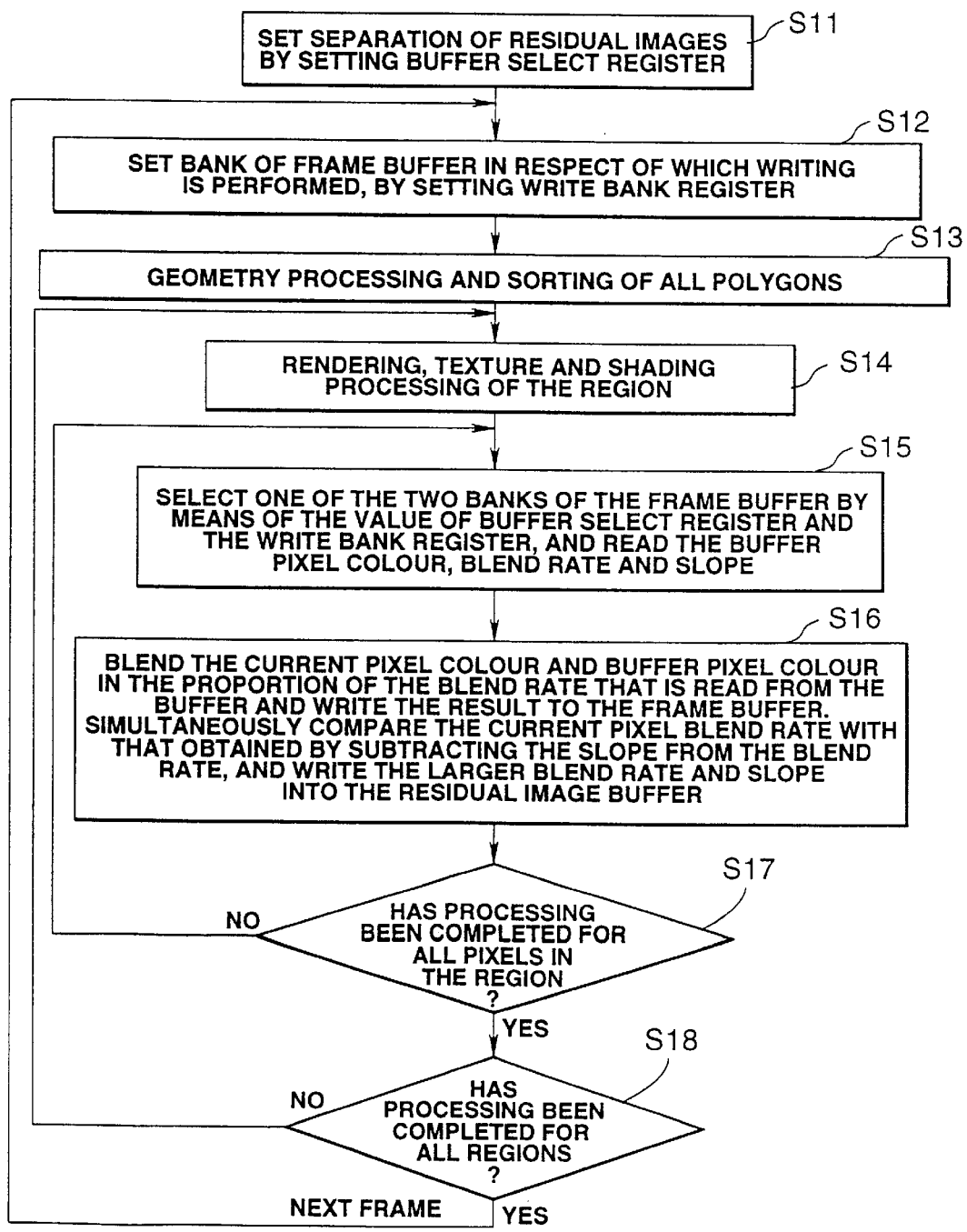
FIG. 9 is a flow chart of residual image processing of an image processing device according to embodiment 2 of the present invention.

FIG. 9 is a flow chart showing the processing of residual image circuit 100 using the residual image effect in polygon units.

Step S11: the residual image separation is set by setting the buffer select register.

Step S12: the bank of the frame buffer in respect of which writing is to be performed is set by setting the write bank register.

Step S13: geometry processing and sorting are performed on all polygons.

Step S14: processing for rendering, texture and shading of the region is performed.

Step S15: one of the two banks of the frame buffer is selected in accordance with the value of the buffer select register and write bank register, and the pixel colour, blend rate and slope of the buffer are read.

Step S16: the current pixel colour and the pixel colour of the buffer are blended in the ratio of the blend rate that was read from the buffer, and the result is written to the frame buffer. Simultaneously, the result obtained by subtracting the slope from the blend rate is compared with the blend rate of the current pixel, and the larger blend rate and slope are written to the residual image buffer.

Step S17: a determination is made as to whether or not processing has been performed in respect of all the pixels in the region. If processing has been completed in respect of all the pixels (Yes), the procedure returns to step S18; otherwise (No), it returns to step S15.

Step S18: a determination is made as to whether or not all regions have been processed. If processing of all regions has been completed (Yes), the procedure repeats the processing subsequent to step S11 for the next frame. Otherwise (No), it returns to step S14.

Figure 16:
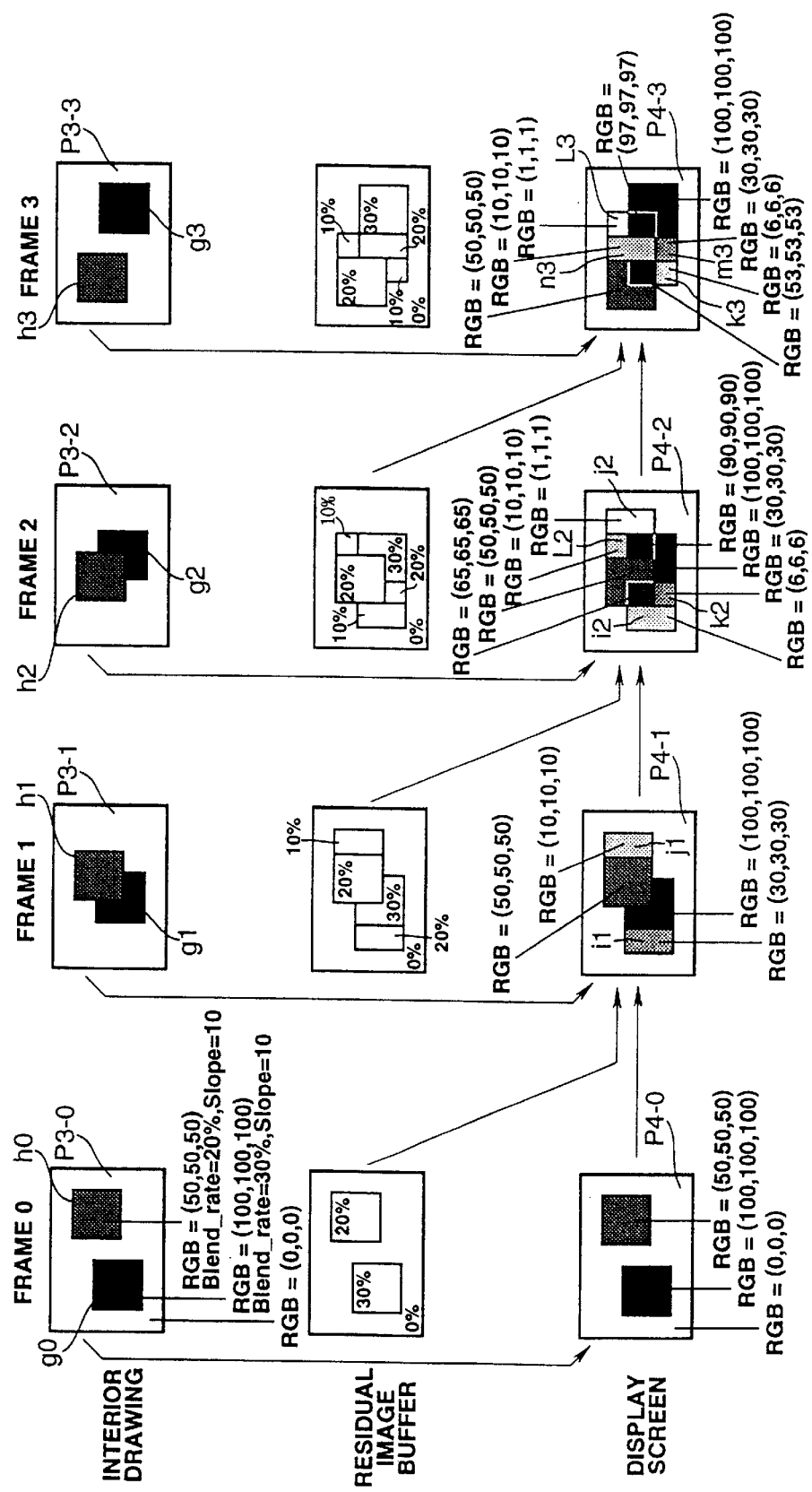
FIG. 16 is an example of a residual image screen of processing for performing blending of a preceding frame according to an embodiment of the present invention.

The residual image effect produced by the residual image circuit extends to each polygon. The residual image effects shown in FIG. 16 are obtained when the slope is 10 and the blend rate register is 20% and 30%.

Embodiment 3 of the Invention

Figure 10:
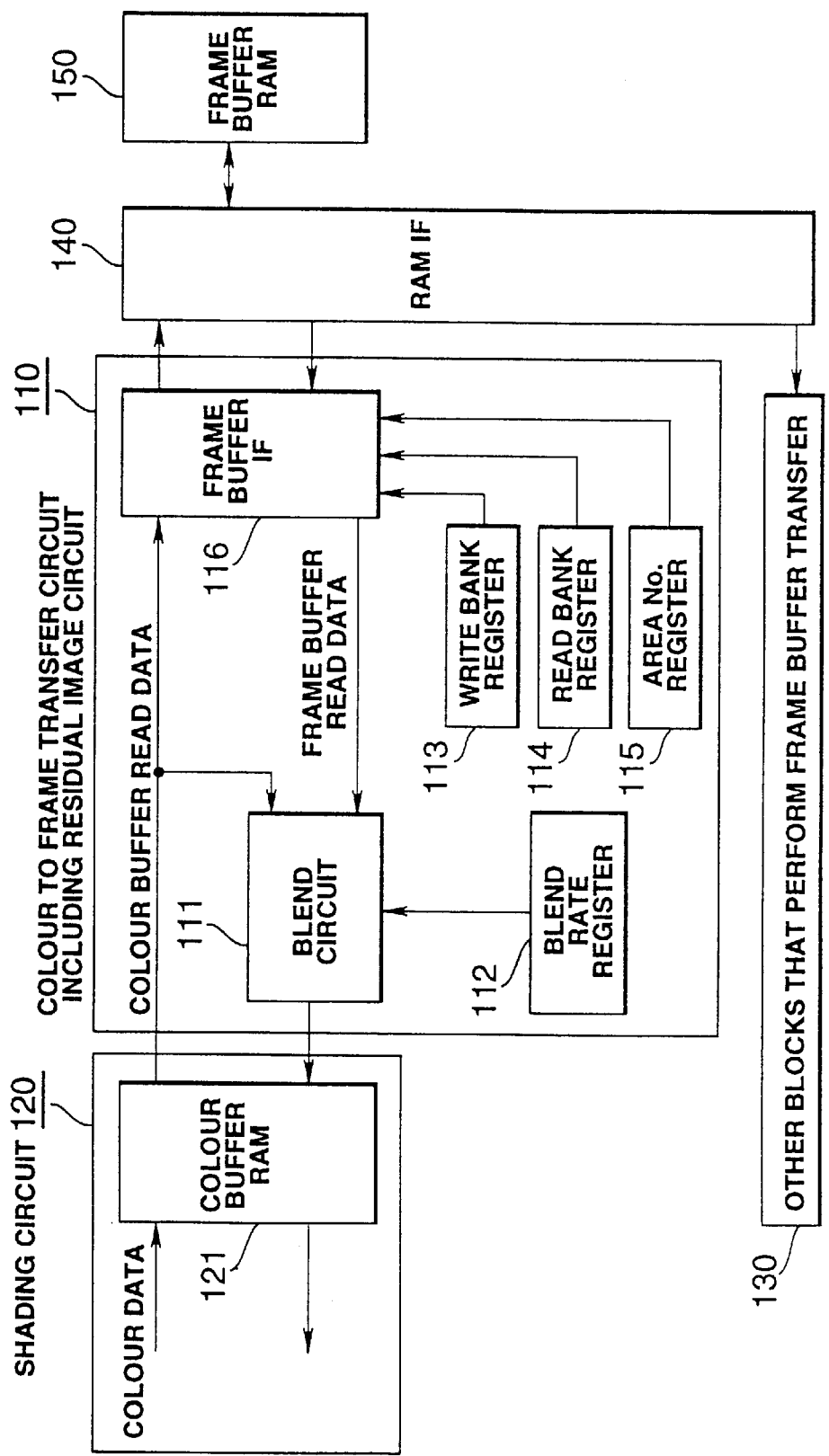
FIG. 10 is a functional block diagram of an image processing device according to embodiment 3 of the present invention.

A functional block diagram for actually implementing the layout of embodiment 1 of the invention is shown in FIG. 10.

In FIG. 10, colour buffer RAM 121 is RAM contained within shading circuit 120 and temporarily stores the colour data. For example, it stores the colour data of 8×8 pixels. Its interior is of a two-bank construction so that, when writing is being performed to one bank by means of shading circuit 120, transfer circuit 110 can access the other bank. For access, reading and writing can be performed simultaneously. The data are 32-bit data and RGBA are respectively 10, 10, 10, 2 bits.

Blend rate register 112 holds the rate when blending is effected of the colour of frame buffer RAM 150 and the colour of colour buffer RAM 121. For example in the case of 8-bit data, the value may take the values 0~FFh. It is incremented if the most-significant bit (MSB) is 1, and a blend rate of FIX 1,8 is assumed for 0 to 100 h.

Blend circuit 111 blends the read data (colour buffer colour) of colour buffer RAM 121 with the read data (frame buffer colour) of frame buffer RAM 150 with the value of blend rate register 112. The blend formula is as follows.

(Blend colour)=(colour buffer colour)×(1-blend rate)+(frame buffer colour)×(blend rate)

Write bank register 113 is a register that is referred to when frame buffer RAM 150 is written. It holds the bank that is written to when the data of colour buffer RAM 121 is transferred to frame buffer RAM 150.

Read bank register 114 is a register that is consulted when frame buffer RAM 150 is read. It holds the bank that is read when the data of frame buffer RAM 150 and the data of colour buffer RAM 121 are blended. If there is a read bank register 114, a changeover operation "on this occasion, blend the preceding frame, on the next occasion blend the frame before the preceding frame" can be performed, which enables appropriate setting of the residual image separation.

Area No register 115 holds information indicating which portion within the bank colour buffer RAM 121 corresponds to.

Frame buffer IF (interface) 116 generates the timing of RAMIF 140 when frame buffer RAM 150 is accessed.

RAMIF 140 generates the access timing of frame buffer RAM 150. It also performs arbitration with another block 130 that effects transfer of frame buffer data.

Frame buffer RAM 150 is a RAM constituting a frame buffer for storing colour data. Two or more banks are set up within the frame buffer.

In the layout of FIG. 10, there are two types of data flow. One of these is a flow for performing blend processing; in this flow, read data of colour buffer RAM 121 and read data of frame buffer RAM 150 are blended by blending circuit 111 and written bank to colour buffer RAM 121. In another type of flow, the read data of colour buffer RAM 121 are transferred to frame buffer RAM 150 without modification.

Figure 11:
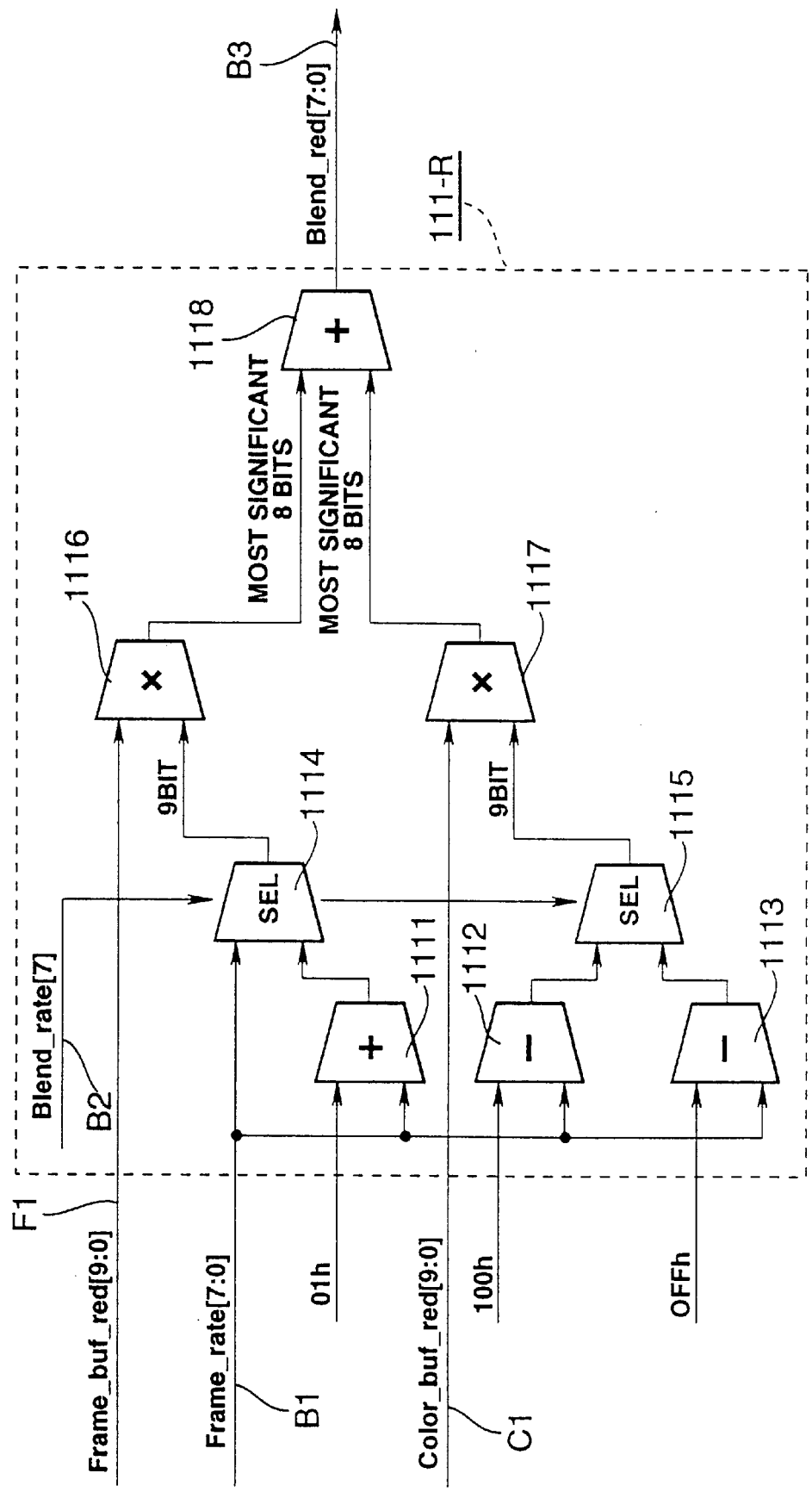
FIG. 11 is a block diagram showing the layout of a blending circuit of an image processing device according to embodiment 3 of the present invention.

FIG. 11 is a block diagram showing the internal layout of blending circuit 111. In FIG. 11, of blending circuit 111, portion 111-R indicates a portion where processing for the red colour is performed; this constitutes one of the three primary colours.

B1 (Blend rate [7:0]) is a coefficient that determines the blending ratio that is read from blend rate register 112. B2 (Blend rate [7]) serves to change over the selector in accordance with the blending ratio.

B3 (Blend red [7:0]) is the blend output of "red".

C1 (Colour buf red [7:0]).is the Red Data from colour buffer RAM 121.

F1 (Frame buf red [7:0]) is the red Data from frame buffer RAM 150.

Adder 1111 adds the blend rate B1 and "01h". Subtractor 1112 subtracts blend rate B1 from "100h". Subtractor 1113 subtracts blend rate B1 from "OFFh". Selectors 1114 and 1115 operate in accordance with blend rate B2. Their output is 9-bit. Selector 1114 selects one or other of blend rate B1 and the output of adder 1111, while selector 1115 selects one or other of the outputs of subtractor 1112 and 1113. Multiplier 1116 multiplies frame buffer data F1 by the output of selector 1114. Multiplier 1117 multiplies the colour buffer data C1 by the output of selector 1115. Adder 1118 adds the most-significant 8 bits of multiplier 1116 and the most-significant 8 bits of multiplier 1117, and outputs blend output B3.

The above processing can be expressed mathematically by the following expressions:

When $B1 \leqq 7$ Fh, $$B3 = F1 \times B1 + C1 \times (9'h\ 100 - C1)$$

When $B1 \geqq 80$ h, $$B3 = F1 \times (B1+1) + C1 \times (9'h\ OFF - C1)$$

Apart from circuit 111-R for processing red, the blend circuit 111 comprises circuits for processing in respect of green and blue. It may also comprise a circuit for processing character (Alpha).

Embodiment 4 of the Invention

Figure 12:
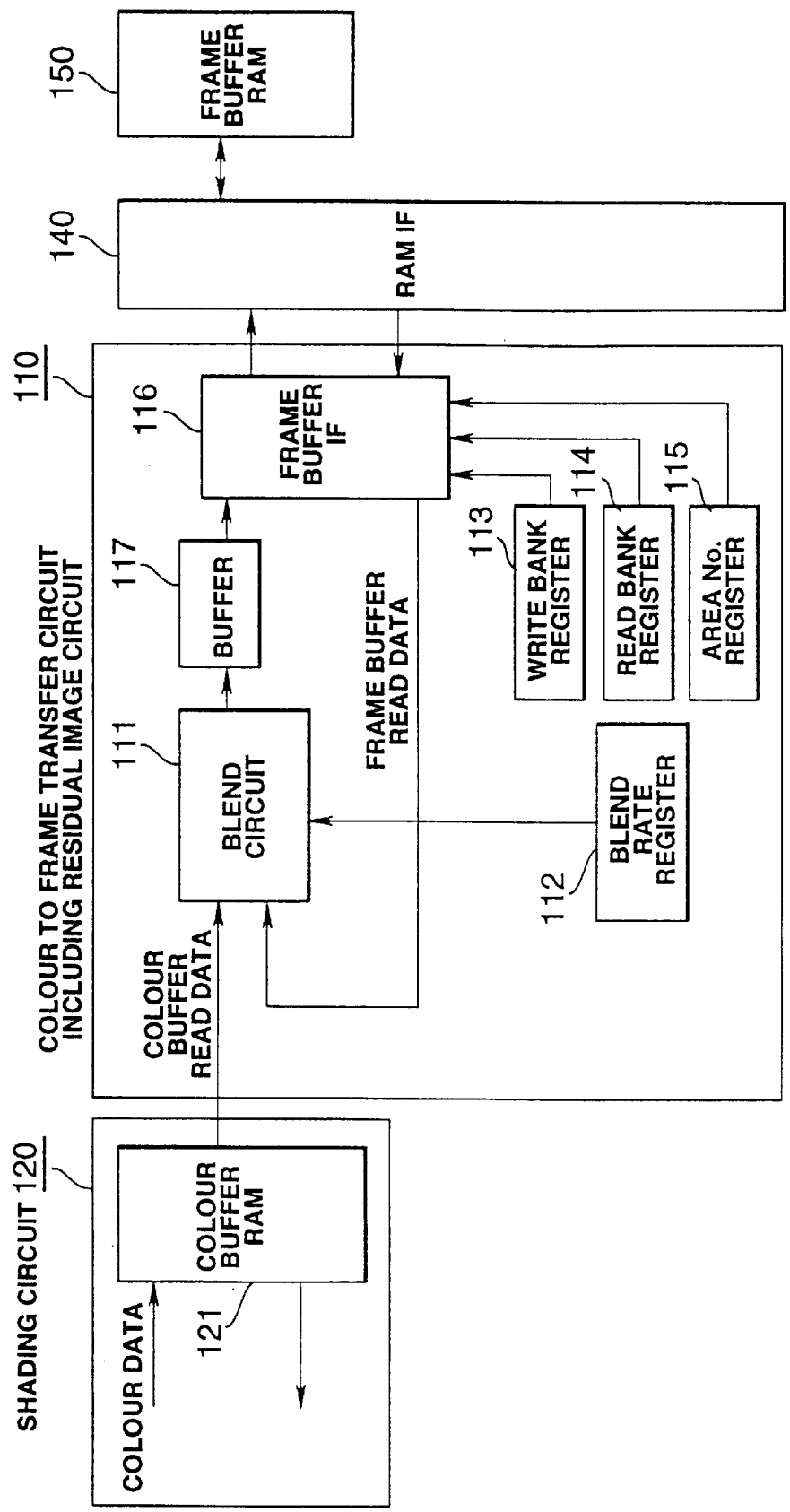
FIG. 12 is a functional block diagram of an image processing device according to embodiment 4 of the present invention.

In the circuit of FIG. 10 of embodiment 3 of the invention, the blend data was written back to colour buffer RAM 121, but a layout may also be considered in which writing to frame buffer RAM 150 is effected directly without writing back. Such a case is the circuit shown in FIG. 12. Frame buffer RAM 150 is of large capacity, so a DRAM-type memory is employed. For example, an SDRAM device may be employed. Burst transfer is effected in order to support the transfer rate in writing and reading in respect of frame buffer RAM 150, but, since data is read and written continuously, a burst-length buffer must be provided internally. Buffer 117 in FIG. 12 is a buffer for this purpose.

In contrast, with the circuit of FIG. 10, there is no write-back to colour buffer RAM 121, so there is no particular requirement for an internal buffer.

Embodiment 5 of the Invention

Figure 13:
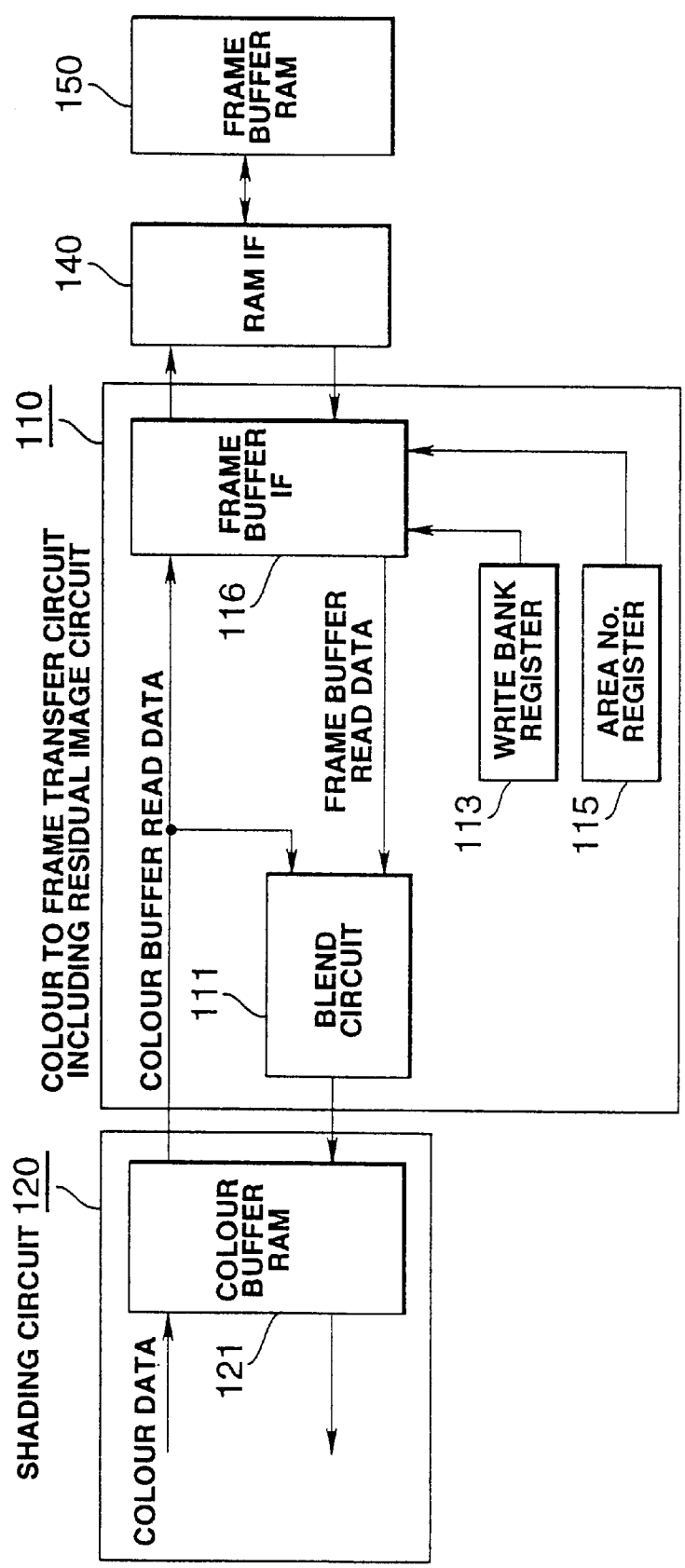
FIG. 13 is a functional block diagram of an image processing device according to embodiment 5 of the present invention.

The layout of embodiment 3 (FIG. 10) and embodiment 4 (FIG. 12) of the invention can be further simplified. A much-simplified layout example is shown in FIG. 13. The functional blocks of this Figure do not include the blend rate register 112 or read-back register 114 of FIG. 10.

Since it does not include a blend rate register 112, the device of FIG. 13 has a fixed blend rate i.e. it always performs blending processing in the same ratio.

Since it does not include a read-back register 114, in the device of FIG. 13, the frame where blending is performed is fixed. If there is a read-back register 114, a changeover operation "on this occasion, blend the preceding frame, on the next occasion, blend the frame before the preceding frame" is possible, making it possible to manipulate the residual image separation, but, if there is no read-back register, "always blend the preceding frame" is the only alternative, so the residual image separation cannot be manipulated.

A circuit layout may also be considered in which only a blend rate register 112 or only a read-back register 114 is added to the device of FIG. 13.

Embodiment 6 of the Invention

Figure 14:
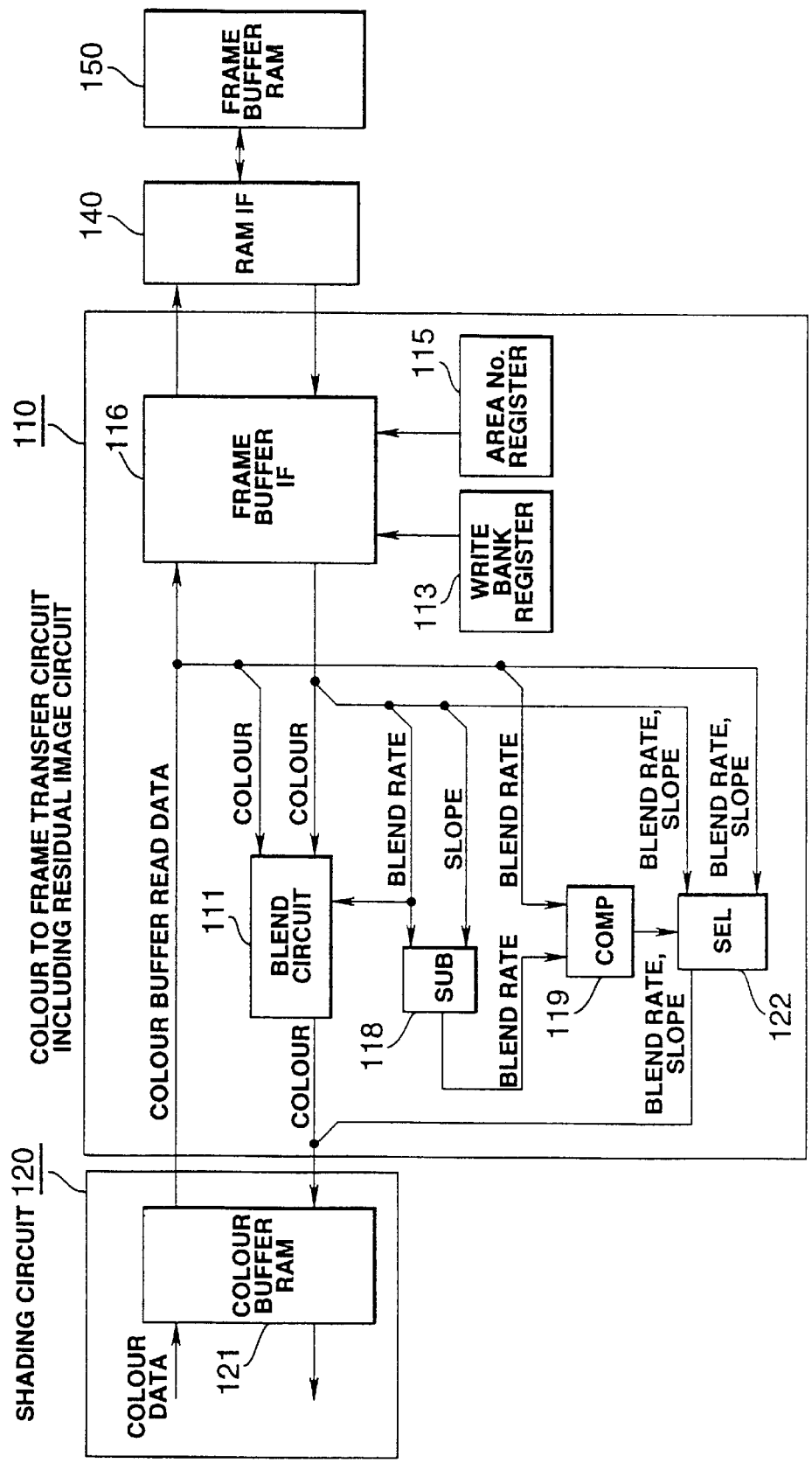
FIG. 14 is a functional block diagram of an image processing device according to embodiment 6 of the present invention.

FIG. 14 shows a functional block diagram for actual implementation of the layout of embodiment 2 of the invention. This Figure shows a functional block diagram of a device for altering the blend rate in pixel units.

Apart from the colour data of pixel units, colour buffer RAM 121 and frame buffer RAM 150 store the blend rate and slope of pixel units. In FIG. 14, there are added an SUB (subtraction) circuit 118 that subtracts the amount of slope from the blend rate, a COMP (comparison) circuit 119 that compares the blend rate of frame buffer RAM 150 with the blend rate of colour buffer RAM 121, and a SEL (selection) circuit 122 that selects one or other of the blend rate and slope of frame buffer RAM 150 and the blend rate and slope of colour buffer RAM 121.

By means of these added circuits, of the blend rates stored in frame buffer RAM 150, the blend rate of the current frame is found, and, by comparison with the blend rate of colour buffer RAM 121, the larger blend rate is selected, and this is written back to colour buffer RAM 121, together with the slope.

Examples of Residual Images

1. Example of Residual Image Effect of Entire Screen

FIG. 15 shows an example of a residual image screen produced by processing to apply the residual image effect to an entire screen. In the case of this Figure, the blend rate was 20% and blending was always applied to the preceding frame. Also, the blending processing was in accordance with the following formula:

$$(\text{Blend colour}) = (\text{colour buffer colour}) \times (1 - \text{blend rate}) + (\text{frame buffer colour}) \times (\text{blend rate})$$

In frame 0, RGB=(100, 10, 100) is drawn in region a0 of interior drawing P1-0. At this point, in accordance with the following expression, RGB=(80, 80, 80) is displayed in region b0 of display screen P2-0. It should be noted that, since no Figure is drawn prior to frame 0 (in the entire frame, RGB=(0, 0, 0)), region a0 and region b0 coincide. The time interval between one frame and another corresponds to the refresh period (for example ⅟₆₀ seconds).

$$(\text{Blend colour}) = 100 \times (1-0.2) + 0 \times 0.2 = 80$$

In frame 1, RGB=(100, 100, 100) is drawn in region a1 of interior drawing P1-1 (moved slightly to the right from region a0). At this point, RGB=(16, 16, 16), RGB=(96, 96, 96) and RGB=n (80, 80, 80) are respectively displayed, in accordance with the following expressions, in regions b1, c1, and d1 of display screen P2-1. Region c1 is the common region of region a0 and a1; region b1 is the portion other than region a0; and region d1 is the portion other than the region common with region a1.

$$(\text{Blend colour}) = 0 \times (1-0.2) + 80 \times 0.2 = 16$$

$$(\text{Blend colour}) = 100 \times (1-0.2) + 80 \times 0.2 = 96$$

$$(\text{Blend colour}) = 100 \times (1-0.2) + 0 \times 0.2 = 80$$

In frame 2, RGB=(100, 100, 100) is drawn in the region a2 (moved a little to the right from region a1) of interior drawing P1-2. At this point, RGB=(3, 3, 3), RGB=(16, 16, 16), RGB=(96, 96, 96), and RGB=(80, 80, 80) are respectively displayed, in accordance with the following expressions, in regions b2, c2, d2, e2 of display screen P2-2. Region e2 is the portion other than regions b2, c2, d2 (portion of region a2 other than the common portion of region a1 and region a2).

(Blend colour)=0×(1−0.2)+16×0.2=3.2=3

(Blend colour)=0×(1−0.2)+80×0.2=16

(Blend colour)=100×(1−0.2)+80×0.2=96

(Blend colour)=100×(1−0.2)+0×0.2=80

In frame 3, RGB=(100, 100, 100) is drawn in region a3 (moved a little further to the right from region a2) of interior drawing P1-3. At this point, RGB=(3, 3, 3), RGB=(16, 16, 16), RGB=(96, 96, 96) and RGB=(80, 80, 80) are respectively displayed, in accordance with the following expressions, in regions c3, d3, e3, f3 of display screen P2-3. Region f3 is the region other than regions c3, d3, e3 (portion of region a3 other than the portion common to region a2 and region a3). Also, since region b2 is 0 as a result of residual image processing, it does not appear in P2-3.

(Blend colour)=0×(1−0.2)+16×0.2=3.2=3

(Blend colour)=0×(1−0.2)+80×0.2=16

(Blend colour)=100×(1−02)+80×0.2=96

(Blend colour)=100×(1−02)+0×0.2=80

In this way, representation can be effected in such a way that a moving object leaves a trail behind it, due to the residual image processing of this embodiment of the invention.

2. Example of residual image effect of polygon unit

FIG. 16 shows an example in which the residual image effect is implemented in a polygon unit, and blending processing is always carried out using the preceding frame. In this Figure, two polygons, g, h are drawn. Polygon g moves from left to right and polygon h moves in the opposite direction from right to left, and, during this process, polygons g and h partially overlap. In the case of the Figure, the level, blend rate and slope of the interior drawing of polygon g are respectively RGB=(100, 100, 100), 30%, and 10. Also, the level, blend rate and slope of the interior drawing of polygon h are respectively RGB=(50, 50, 50), 20%, and 10. The numerical values in the screen whereby the residual image buffer is shown in FIG. 16 respectively indicate the blend rates.

The calculation of blend colour is the same as in the case of FIG. 15, but the case of FIG. 16 differs in that the slope value is set and the blend rate decreases in accordance with this. Also, from P4-0 to P4-3 of FIG. 16, polygons g, h are not blended with the background, but, since they are blended with the residual images of the polygons, they are not displayed in the same way as is the internal drawing.

The calculation is performed in accordance with (Blend pixel colour)=(current pixel colour)×(1−(blend rate))+(pixel colour of buffer)×(blend rate)

In P4-1,
(Region i1)=100×0.3=30
(Region j1)=50×0.2=10

In P4-2,
(Region i2)=30×0.2=6
(Region j2)=10×0.1=1
(Region k2)=100×0.3=30
(Region L2)=50×0.2=10
(Region of overlap of residual image of internal drawing h1 and internal drawing g2)=100×0.8+50×0.2=90
(Region of overlap of internal drawing h2 and internal drawing g1)=50×0.7+100×0.3=65

In P4-3,
(Region i3)=6×0.1=0.6=0
(Region j3)=1×0.1=0.1=0
(Region k3)=30×0.2=6
(Region L3)=10×0.1=1
(Region m3)=100×0.3=30
(Region n3)=50×0.2=10
(Region of overlap of residual image of internal drawing h2 and internal drawing g3)=100×0.7+90×0.3=97
(Region of overlap of residual images of internal drawing h3 and internal drawing g2)=50×0.8+65×0.2=53

It should be noted that, as polygons g, h are not blended with the background, a method could also be applied in which they are displayed in the same way as is their internal drawing.

With this embodiment of the invention, in a device that applies a residual image effect to the entire screen, a residual image effect that previously necessitated processing by means of software can be implemented by the addition of simple circuitry. If the residual image effect is processed by software, the residual images must be processed in the same way as ordinary objects, so a considerable number of polygons are necessitated. In this respect, in this circuit, the residual images are processed by blending the picture of the previous frame, so there is no increase at all of polygons in respect of residual images. However, since blending is performed with the entire screen, the colour of the object is blended with the background colour, so there is the drawback that the original colour is not produced.

Also, with this embodiment of the invention, with a device that applies the residual image effect in polygon units, although an appreciable number of buffers are required, since the blend rate can be set independently in the background and the object, the colour of the object can be exhibited as its true colour. Also, setting can be effected such that individual objects have respective residual images, or do not have such images, or the degree to which such images are displayed can be set.

Embodiment 7 of the Invention

Figure 17:
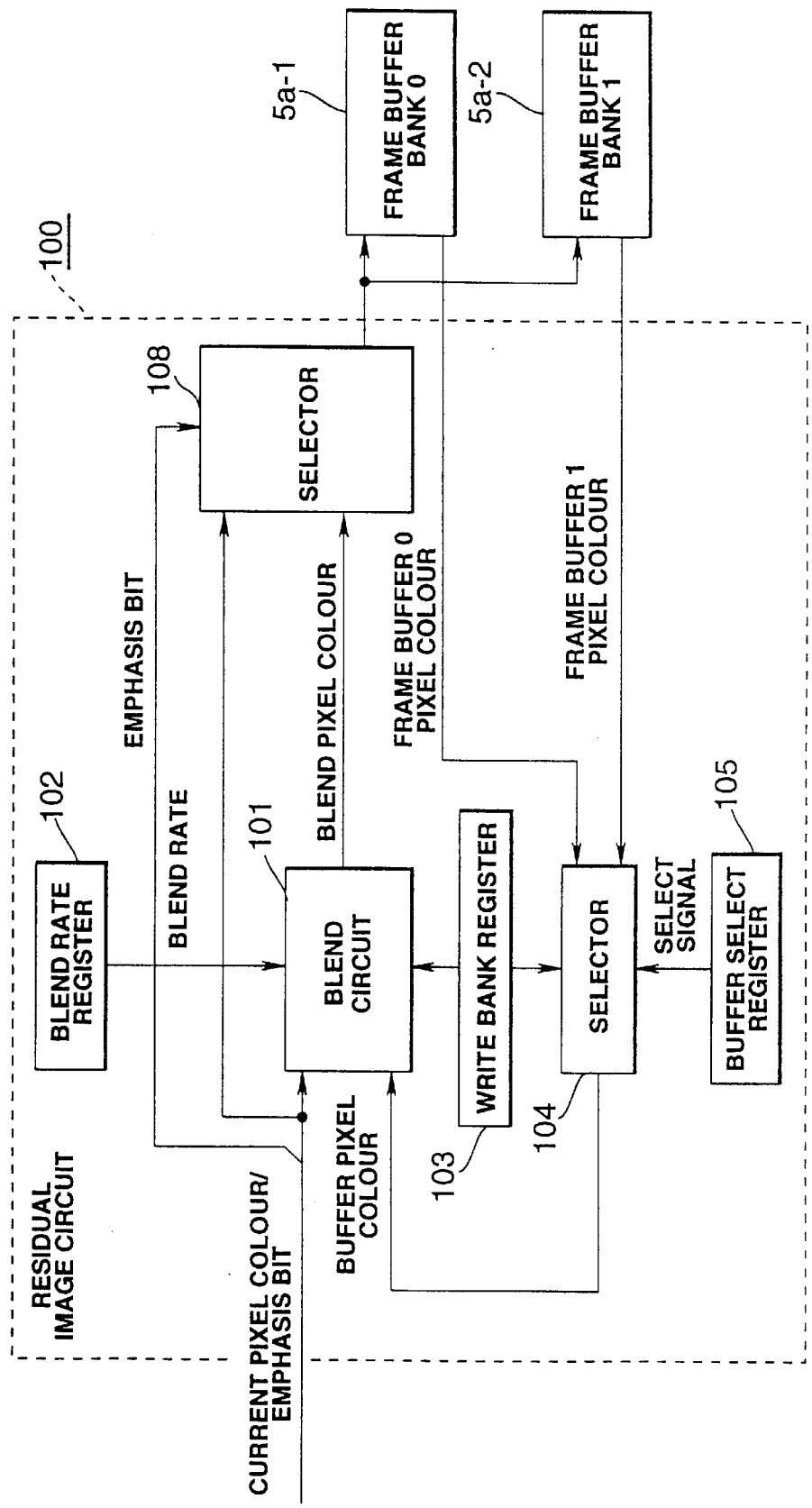
FIG. 17 is a functional block diagram of a residual image circuit of an image processing device according to embodiment 7 of the present invention.

Next, an image processing device according to embodiment 7 of the invention will be described. The image processing device of this embodiment has practically the same construction as the image processing device of embodiment 1 shown in FIG. 1, only the residual image circuit being different from that of embodiment 1. FIG. 17 is a block diagram showing an outline of a residual image circuit according to embodiment 7 of the present invention. The residual image circuit shown in FIG. 17 practically corresponds with the residual image circuit according to embodiment 1 (see FIG. 6), so identical structural portions will be given the same reference symbols as in the case of the structural portions of the residual image circuit of FIG. 6.

Residual image circuit 100 of this embodiment comprises, in addition to blend circuit 101, blend rate register 102, write bank register 103, selector 104 and buffer select register 105, a selector 108 that operates in accordance with the content of an emphasis bit, to be described. Also, in this embodiment, an emphasis bit is added to the current pixel colour supplied from outside, for example. This is implemented for example by allocating the most-significant bit of the current pixel colour to the emphasis bit. Also, in a current pixel colour. wherein an emphasis bit is allocated to the most-significant bit, only the emphasis bit is supplied to selector 108. The data excluding the emphasis bit is supplied to one input side of selector 108 and to blend circuit 101. Also, the output of blend circuit 101 is supplied to the other input side of selector 108.

The emphasis bit can take a value of either "1" or "0". In the case of a pixel whose emphasis bit is "1", the residual image circuit operates such as to maintain the original brightness. For example, prior to processing by the residual image circuit (blend processor 53), some structural portion of shading processor 5 (see FIG. 5) may, in respect of the data of pixel colour, of a pixel constituting a polygon that is to be emphasised (i.e. that is to be displayed with its original brightness), set the emphasis bit to "1" and write the pixel colour data to which the emphasis bit is attached into colour buffer 54 (see-Fig. 5).

Figure 18:
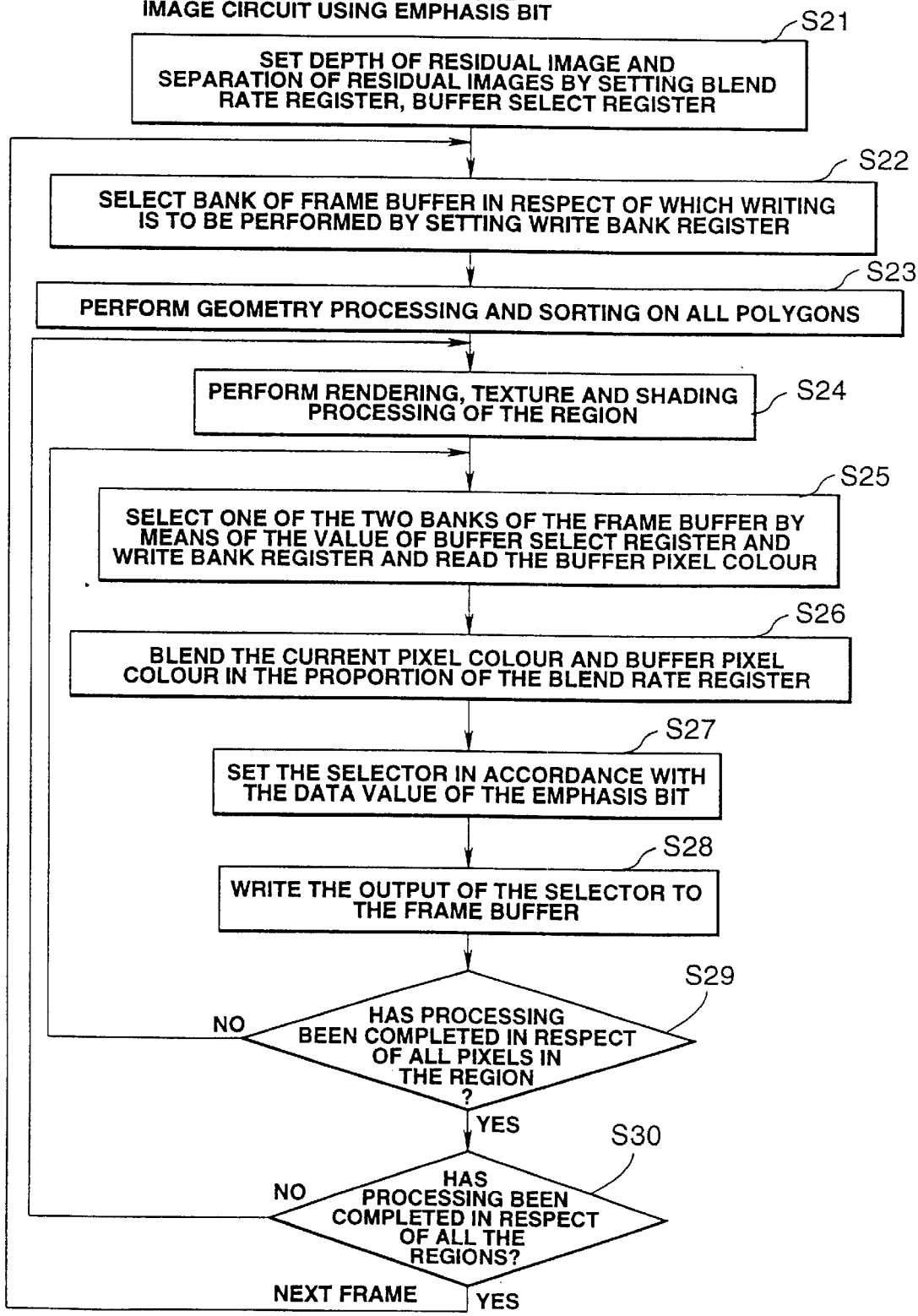
FIG. 18 is a flow chart showing residual image processing of an image processing device according to embodiment 7 of the present invention.

Processing of a residual image circuit according to this embodiment constructed as above will now be described with reference to the flowchart of FIG. 18. As shown in FIG. 18, this processing is practically the same as that shown in FIG. 7. Step S21 to S25 of FIG. 18 and step 29 and step S30 respectively correspond to step S1 to S5, step S7 and step S8 of FIG. 7.

The processing of step 21 to step 30 will now be described.

Step S21: the density of the residual image and separation of the residual images are set by setting blend rate register 102 and buffer select register 105. In this embodiment, for the density of the residual image, a value of 20% or 30% is selected. The separation of the residual images determines whether the image data that is left as residual image is to be the data of the preceding occasion or is to be the data of the occasion previous to the preceding occasion.

Step S22: bank 0 or 1 of the frame buffer 5a in respect of which writing is performed is set by setting write bank register 103.

Step S23: geometric processing and sorting are performed on all polygons.

Step S24: rendering, texture, and shading processing are performed on the region.

Step S25: the pixel colour of the buffer is read by selecting one from the two banks 0, 1 of frame buffer 5a, in accordance with the value of buffer select register 105 and write bank register 103.

Step S26: the current pixel colour and buffer pixel colour are blended in the ratio determined by the data of the blend rate register, by blend circuit 101.

Blend processing is performed in accordance with the following expression, just as in the case of Embodiment 1. (blend pixel colour)=(current pixel colour)×(1−(blend rate))+(buffer pixel colour)×(blend rate)

Step S27: as described above, the emphasis bit that is allocated to the most-significant bit of the current pixel colour is supplied to selector 108. If the emphasis bit is "1", selector 108 selects the current pixel colour i.e. the data that has not passed through blend circuit 101; on the other hand, if the emphasis bit is "0", it selects the blend pixel colour i.e. the output of blend circuit 101.

Step S28: selector 108 writes the selected data (current pixel colour or blend pixel colour) to the frame buffer (5a-1 or 5a-2) to which data is to be written that was set in step S2.

Step S29: a determination is made as to whether processing has been performed in respect of all the pixels within the region. If processing has not been completed in respect of all the pixels (No), the procedure returns to step S25. If processing has been completed in respect of all the pixels (Yes), the procedure returns to step S30.

Step S30: a determination is made as to whether processing has been completed for all the regions. If processing has not been completed for all the regions (No), the procedure returns to step S24. If processing has been completed for all the regions (Yes), the procedure shifts to processing in respect of the next frame, and returns to step S22.

Figure 19:
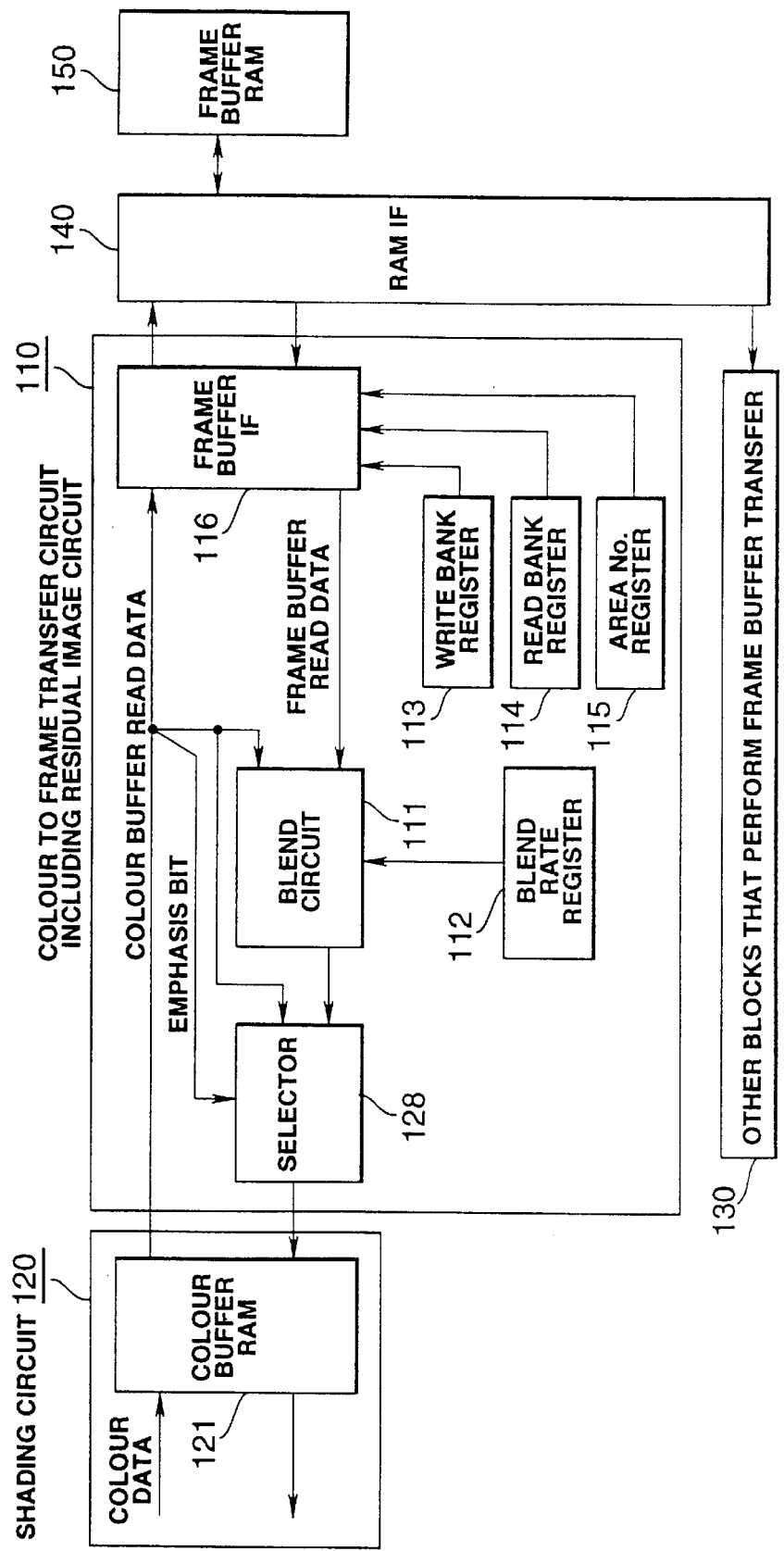
FIG. 19 is a diagram showing an example of the layout of a transfer circuit including a residual image circuit according to embodiment 7 of the present invention.

Just as in the case of Embodiment 1, the transfer circuit including the residual image circuit according to this embodiment can be constituted as shown in FIG. 19. In FIG. 19, the colour buffer read data from colour buffer RAM 121 is supplied to one input side of selector 128, while the output of blend circuit 111 is supplied to the other input side of selector 128. Furthermore, selector 128 is arranged to be changed over in accordance with the emphasis bit attached to the colour buffer read data. The blend circuit and selector can be constructed as shown in FIG. 20.

Figure 20:
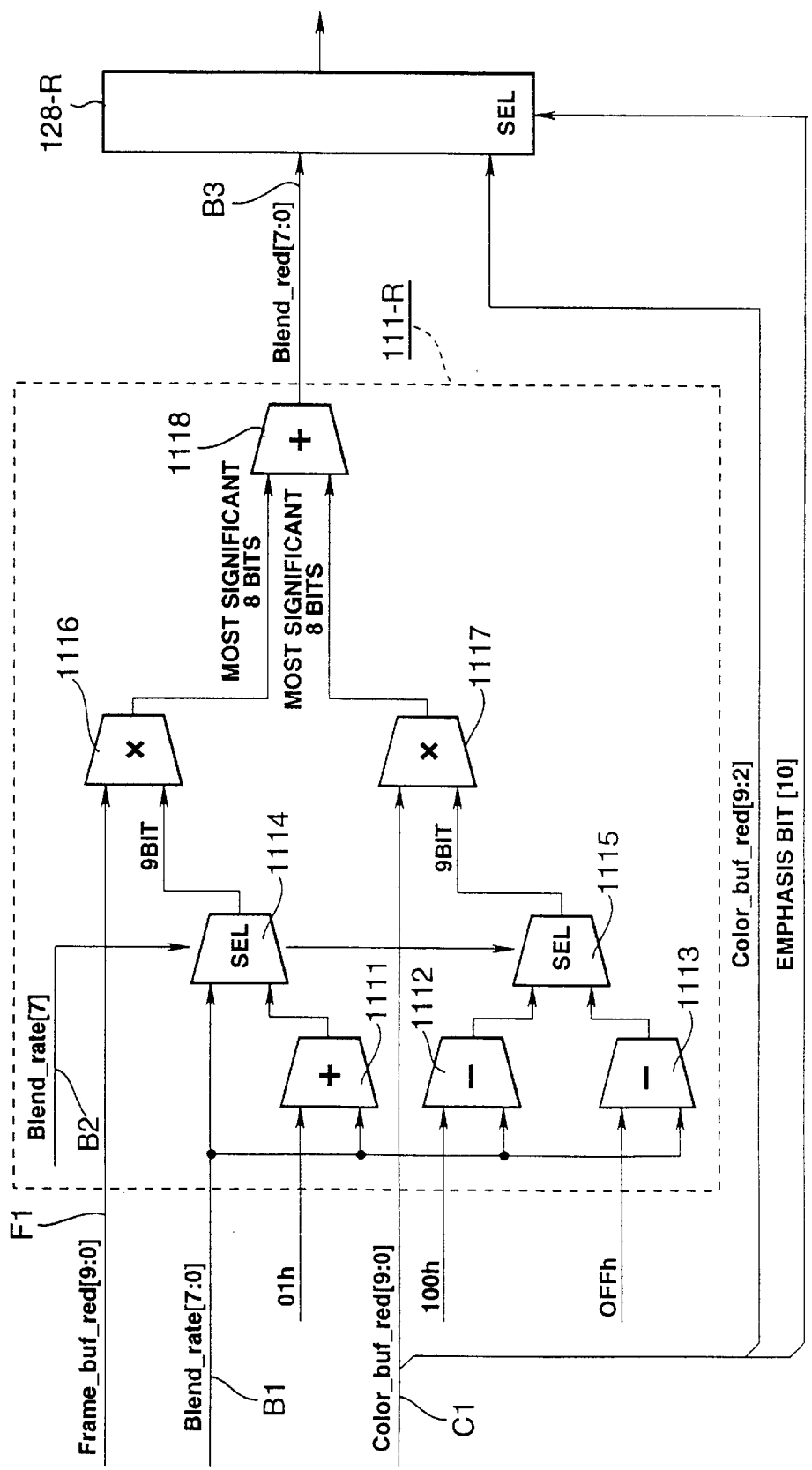
FIG. 20 is a diagram showing a layout example of a selector and blending circuit according to embodiment 7 of the present invention.

In FIG. 20, one or other of the output B3 from blend circuit 111-R or of the 8 bits [9:2] in Color_buf_red C1 is selected by selector 128-R. If the emphasis bit is "1", Color_buf_red [9:2] is output from selector 128-R. If the emphasis bit is "0", Blend_red [7:0] is output from selector 128-R.

Figure 21:
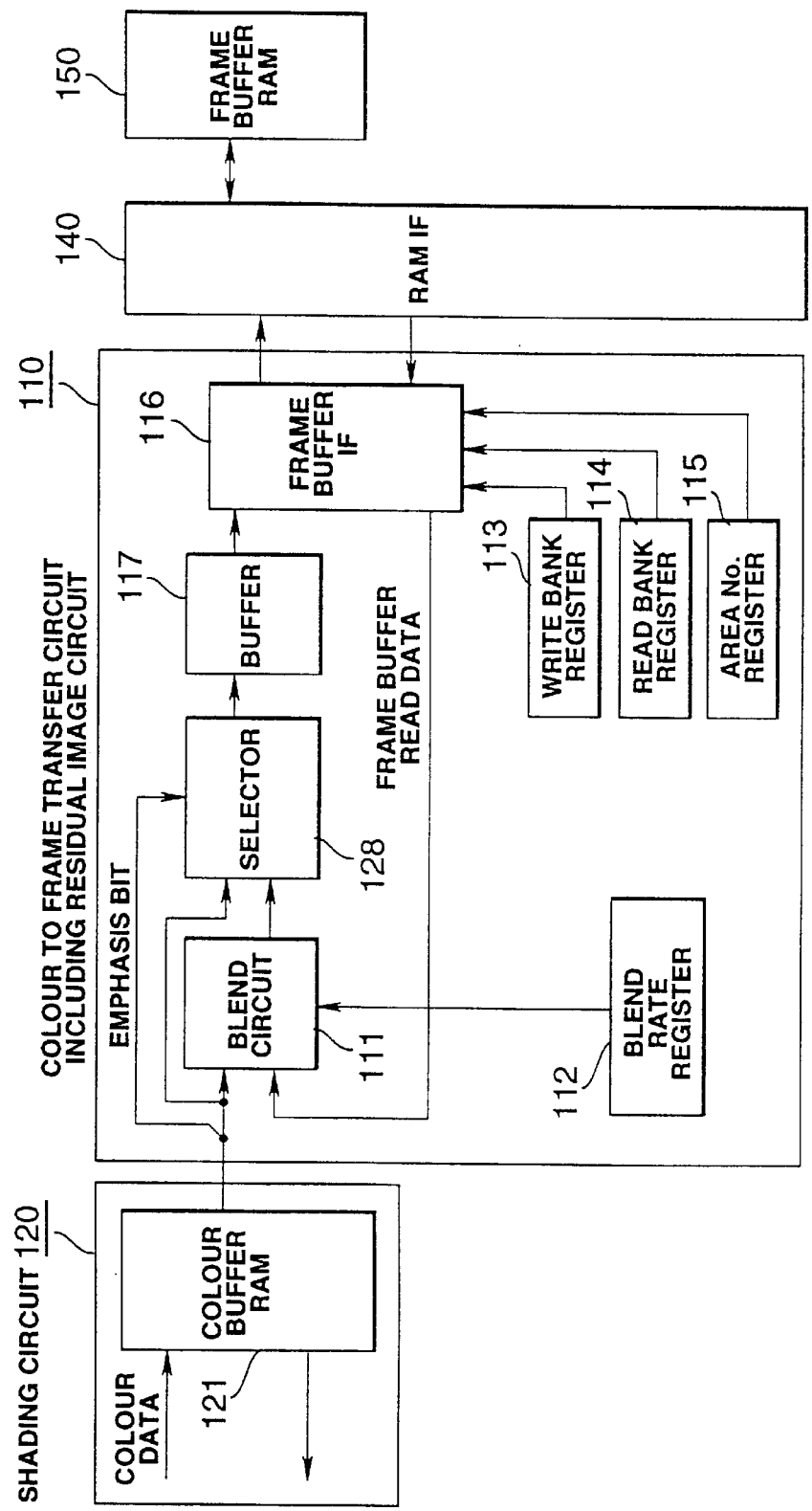
FIG. 21 is a diagram showing a further layout example of a transfer circuit including a residual image circuit according to embodiment 7 of the present invention.
Figure 22:
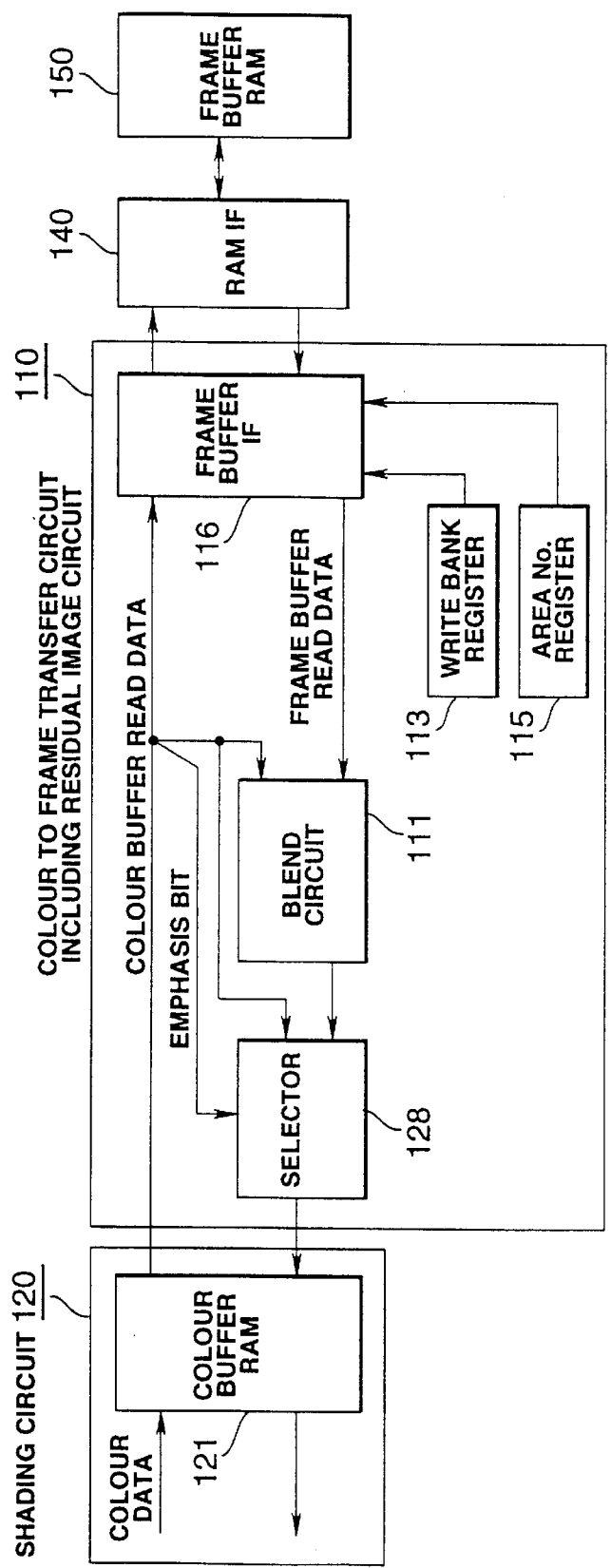
FIG. 22 is a diagram showing a further layout example of a transfer circuit including a residual image circuit according to embodiment 7 of the present invention.

Also, blend circuit 111 and selector 128 can be arranged as shown in FIG. 21 and FIG. 22, respectively corresponding to FIG. 12 and FIG. 13 relating to Embodiment 1.

Examples of Residual Images

FIG. 23 shows an example of a residual image obtained by an image processing device according to this Embodiment 7. The images of frame 0 to frame 3 are respectively generated in accordance with interior drawing of frame 0 to frame 3 shown in FIG. 15. Specifically, in this example, the blend rate is 20%, and blending is always performed in respect of the preceding frame, and blend processing is performed in accordance with the following expression. Also, emphasis bit "1" is added to the pixel data contained in interior drawing regions a0 to a3. (Blend colour)=(colour buffer colour)×(1−blend rate)+(frame buffer colour)×(blend rate)

As can be understood by comparing with FIG. 15, in FIG. 23, in each frame, the data values of regions g0, h1, i2 and j3 respectively corresponding to regions a0 to a3 of the interior drawing are RGB=(100, 100, 100). Specifically, the data values within the internal drawing are maintained unaltered in accordance with the emphasis bit.

In contrast, in the other regions (for example, g1), blend processing is executed in accordance with the above expression. The data value in region g1 in frame 1 becomes: (Blend colour)=0×(1−0.2)+100×0.2=20.

Likewise, the data values of regions g2 and h2 in frame 2 become respectively:

(Blend colour)=0×(1−0.2)+20×0.2=4

(Blend colour)=0×(1−0.2)+100×0.2=20.

Comparing the display drawing of FIG. 15 and the display drawing of FIG. 23, it can be seen that the original region of the display drawing of FIG. 23 is emphasised in comparison with that of FIG. 15, since the data value of the original region (regions a0 etc. of the interior drawing) is maintained. That is, the shape of the original region is clearly maintained and a residual image effect is also obtained.

FIG. 24 is a view showing examples of displays when the emphasis bit is "0" and when the emphasis bit is "0". FIG.

Figures 24A, 24B, 24C:
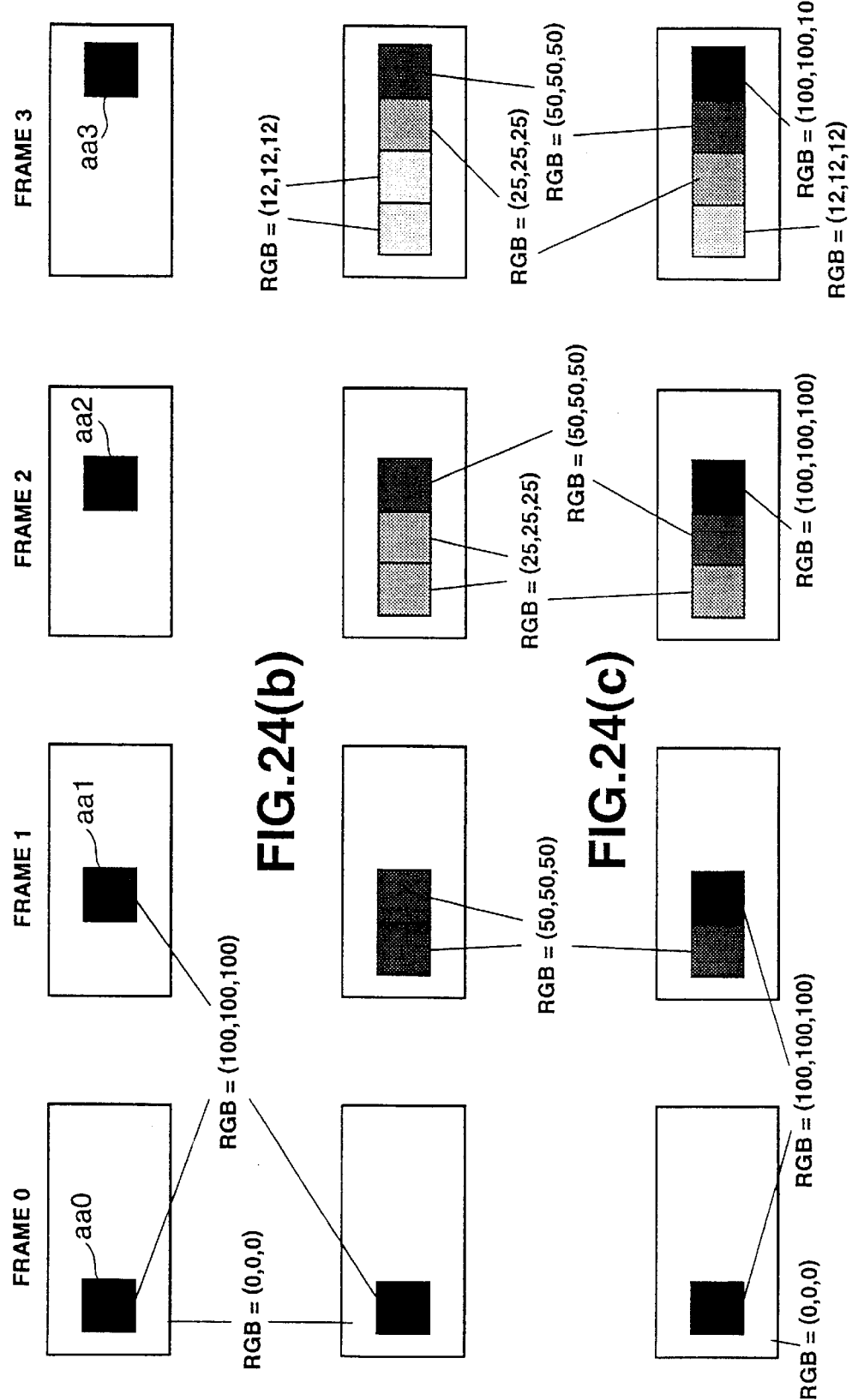
FIG. 24 is a diagram showing an example of a residual image obtained in accordance with this embodiment 7.

24(a) shows the image of internal drawing (or when not subjected to residual image processing); the regions aa0 to aa3 taking the value RGB=(100, 100, 100) move over frame 0 to frame 3. In contrast, FIG. 24(b) shows the image obtained by performing residual image processing with a blend rate of 50% when the emphasis bit that is added to the current pixel colour contained in these regions is "0". Also, FIG. 24(c) shows an image obtained by performing residual image processing with a blend rate of 50% when the emphasis bit that is added to the current pixel colour contained in these regions is "1".

As can be understood from FIG. 24, with this embodiment, a region containing a pixel wherein an emphasis bit "1" has been added to the data can be emphasised in the display image. Consequently, with this embodiment, a residual image effect can be added to a desired polygon and this can be emphasised.

Although in this embodiment there was provided a selector that accepts the output of a blend circuit and a current pixel colour and selects one or other of these, there is no restriction to this construction. For example, rather than outputting from the selector the value of the data of the current pixel colour itself, it could be arranged to output from the selector a value obtained by subjecting this value to processing (for example, processing to an RGB value so as to emphasise a region).

As described above, with the present invention, in an image processing device comprising a control section that writes image data that are generated in a first image memory region and a second image memory region, there is provided a blend circuit that reads image data from the first image memory region or from the second image memory region and that generates a residual image effect by attenuating the image data that is read and writing this together with newly generated image data into another image memory. The residual image function can thereby be given to hardware, enabling processing efficiency to be raised and the speed of processing to be increased.

Also, according to the present invention, an image processing device can be provided whereby a desired residual image effect and/or emphasis effect can be obtained in a desired polygon.

What is claimed is:

1. An image processing device comprising:
   a control section that writes generated image data to a first image memory region and a second image region, the control section further including a blend circuit that reads image data from said first image memory region and whereby a residual image effect is generated by attenuating the read image data and writing the read image data together with generated image data in said second image memory region; and
   a buffer select register that stores residual image separation information and said blend circuit selects a memory from which image data is read in accordance with the select information of said buffer select register.

2. The image processing device according to claim 1 wherein said buffer select register stores a residual image separation which is a parameter indicating the image data to be left behind as a residual image.

3. The image processing device according to claim 2 wherein said buffer select register stores data indicating one frame previous and/or data indicating two frames previous.

4. An image processing device comprising:
   a control section that writes generated image data to a first image memory region and a second image region, the control section further including a blend circuit that reads image data from said first image memory region and whereby a residual image effect is generated by attenuating the read image data and writing the read image data together with generated image data in said second image memory region; wherein
   said first image memory region and said second memory region comprise a residual image buffer that stores, for each respective pixel, blend rate and slope data, which is a parameter for attenuating blend rate, said blend circuit performs read processing of said blend rate and slope from said residual image buffer and the residual image effect can thereby be adjusted for each pixel.

5. The image processing device according to claim 4 comprising a comparator selector that compares the blend rate of the image memory and the blend rate of a current pixel that is input from outside and selects the larger.

6. The image processing device according to claim 5 wherein said comparator selector further selects one or other of the slope of image memory or a slope that is input from outside.

7. The image processing device according to claim 4 wherein said blend circuit subtracts said slope from said blend rate in each residual image processing, and writes the subtraction result to said residual image buffer as a new blend rate.

8. An image processing device comprising:
   a control section that writes generated image data to a first image memory region and a second image memory region, the control section further including a blend circuit that reads image data from said first image memory region and whereby a residual image effect is generated by attenuating the read image data and writing the read image data together with generated image data in said second image memory region; and
   a selector that selects one of image data to be input to said blend circuit and image data output from said blend circuit and that writes the selected image data to the other image memory region.

9. The image processing device according to claim 8 wherein said selector is controlled in accordance with a flag that is contained in said image data that is to be input.

10. The image processing device according to claim 9 wherein said selector, if said flag is set, selects image data to be input to said blend circuit such as to maintain the original brightness.

11. The image processing device according to claim 9 wherein said flag is the most-significant bit of the current pixel colour data of the image memory.

12. An image processing device comprising:
    a frame buffer that stores image data;
    a frame buffer interface that receives pixel data from a preceding-stage circuit and that writes the data to said frame buffer and that reads data from said frame buffer;
    a blend rate register that stores a blend rate when mixing pixel data from said preceding-stage circuit with pixel data of said frame buffer; and
    a first blend circuit that mixes pixel data from the preceding-stage circuit in accordance with the blend rate of said blend rate register with pixel data from said frame buffer interface and returns the result to the preceding-stage circuit.

13. An image processing device comprising:
    a frame buffer that stores, in pixel units, image data, blend rate and slope data, which is a parameter for attenuating blend rate;
    a frame buffer interface that receives, in pixel units, image, blend rate and slope data data from a preceding-stage circuit, and that writes the data to said frame buffer and that reads the data from said frame buffer;

a blend circuit that mixes pixel data from the preceding-stage circuit in accordance with the blend rate of said frame buffer with pixel data from said frame buffer interface;

a subtraction circuit that subtracts a value corresponding to slope from the blend rate;

a comparison circuit that compares the blend rate of said frame buffer with a blend rate from said subtraction circuit; and a selection circuit that selects one or other of the blend rate and slope of said frame buffer and the blend rate and slope from the preceding-stage circuit in accordance with the output of said comparison circuit and that outputs the result to the preceding-stage circuit.

14. An image processing device comprising:

a frame buffer that stores image data;

a blend rate register that stores a blend rate for mixing pixel data from a preceding-stage circuit and pixel data from said frame buffer;

a blend circuit that mixes pixel data from the preceding-stage circuit with pixel data from said frame buffer in accordance with the blend rate of said blend rate register and that returns the result to the preceding-stage circuit; and a selector that receives a flag from the preceding-stage circuit and that selects one of the image data from the preceding-stage circuit or image data output from said blend circuit and that writes the selected image data to said frame buffer.

15. An image processing device comprising a control section that writes generated image data to a first image memory region and a second image memory region, further comprising:

means for writing in the other image memory one of mixed image data obtained by attenuating image data read from one of said first image memory region and second image memory region and mixing it with newly generated image data, and said newly generated image data.

16. The image processing method for applying a residual image effect to an entire screen, comprising the steps of:

setting the density of the residual image, indicating what percentage of the image data of the previous occasion is to be displayed as residual image, and the separation of residual images, which determines whether the image data to be left as residual image is to be constituted by the data of the previous occasion or the data of the occasion previous to the previous occasion;

blending current pixel colour and buffer pixel colour in accordance with the set residual image density and writing the result to a frame buffer;

determining in respect of all pixels in a region whether processing has been completed or not, and, if processing of all the pixels has not been completed, repeating said writing step; and determining whether processing of all the regions has been completed, and, if processing in respect of all the regions has not been completed, repeating said writing step.

17. An image processing method for applying a residual image effect in polygon units, comprising the steps of:

setting the density of a residual image, indicating what percentage of the image data of the previous occasion is to be displayed as residual image and the separation of residual images, that determines whether the image data that is to be left behind as residual image is that of the data of the previous occasion or of the data of the occasion previous to the previous occasion;

sorting the polygons contained in the image;

blending the current pixel colour and buffer pixel colour in accordance with the set density of the residual image and writing the result to the frame buffer;

comparing the density of the image of the current pixel with that when the slope data, which is a parameter indicating the degree of attenuation from the density of the image, is subtracted, and writing the larger image density and slope data in the residual image buffer;

determining whether or not processing has been performed in respect of all the pixels in the region and, if processing has not been completed in respect of all pixels, repeating said writing step; and determining whether processing has been completed in respect of all regions, and, if processing has not been completed in respect of all regions, repeating said writing step.

18. The image processing method according to claim 7, further comprising a step of selecting whether or not blending is to be performed in accordance with an emphasis bit that is allocated to the most-significant bit of the current pixel colour.

* * * * *